(12) United States Patent
Tanimura

(10) Patent No.: US 12,525,813 B2
(45) Date of Patent: Jan. 13, 2026

(54) POWER SWITCHING CIRCUIT

(71) Applicant: DENSO CORPORATION, Kariya (JP)

(72) Inventor: Yasunari Tanimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/891,775

(22) Filed: Sep. 20, 2024

(65) Prior Publication Data

US 2025/0192587 A1 Jun. 12, 2025

(30) Foreign Application Priority Data

Dec. 8, 2023 (JP) .................................. 2023-207970

(51) Int. Cl.
*H02J 7/00* (2006.01)
*H02J 7/34* (2006.01)
*H02J 9/06* (2006.01)

(52) U.S. Cl.
CPC .......... *H02J 7/0063* (2013.01); *H02J 7/0068* (2013.01); *H02J 7/345* (2013.01); *H02J 9/061* (2013.01)

(58) Field of Classification Search
CPC .......... H02J 7/00; H02J 7/0063; H02J 7/0068; H02J 7/34; H02J 7/345; H02J 9/06; H02J 9/061
See application file for complete search history.

(56) References Cited

U.S. PATENT DOCUMENTS

| 5,764,032 A | 6/1998 | Moore |
| 2020/0335966 A1 | 10/2020 | Sato et al. |
| 2023/0077522 A1 | 3/2023 | Takahashi |

*Primary Examiner* — Robert L Deberadinis
(74) *Attorney, Agent, or Firm* — Posz Law Group, PLC

(57) ABSTRACT

A power switching circuit is connected to a first power supply, a second power supply, a first circuit and a second circuit. The power switching circuit has a first main path, a second main path, a first switching path, and a second switching path. The power switching circuit has a control circuit that forms a power supply path by controlling each of the first main path, the second main path, the first switching path, and the second switching path in either a conducting or non-conducting state. When a failure is generated in one of the first circuit and the second circuit, the control circuit forms a power supply path that does not affect the operation of the other of the first circuit and the second circuit.

13 Claims, 18 Drawing Sheets

FIG. 7

|  | SW11 | SW12 | SW13 | SW14 | SW15 | SW16 | SW17 | SW18 |
|---|---|---|---|---|---|---|---|---|
| NORMAL CONDITION | ON | ON | OFF | OFF | OFF | OFF | ON | ON |
| PS1 ABNORMAL CONDITION | OFF | OFF | OFF | ON | ON | OFF | ON | ON |
| PS2 ABNORMAL CONDITION | ON | ON | ON | OFF | OFF | ON | OFF | OFF |
| CKT1 SHORT CIRCUIT CONDITION | OFF | OFF | OFF | OFF | OFF | OFF | ON | ON |
| CKT2 SHORT CIRCUIT CONDITION | ON | ON | OFF | OFF | OFF | OFF | OFF | OFF |

FIG. 8

| | | SW11 | SW12 | SW13 | SW14 | SW15 | SW16 | SW17 | SW18 |
|---|---|---|---|---|---|---|---|---|---|
| NORMAL CONDITION | | ON | ON | OFF | OFF | OFF | OFF | ON | ON |
| SW12 OPEN FAULT | PS1≥PS2 | OFF | FAULT | ON | ON | OFF | OFF | ON | ON |
| | PS1<PS2 | OFF | FAULT | OFF | ON | ON | OFF | ON | ON |
| SW18 OPEN FAULT | PS1≥PS2 | ON | ON | ON | OFF | OFF | ON | OFF | FAULT |
| | PS1<PS2 | ON | ON | OFF | OFF | ON | ON | OFF | FAULT |

|  | SW11a | SW17a | SW13a | SW14a | SW15a | SW16a |
|---|---|---|---|---|---|---|
| NORMAL CONDITION | ON | ON | OFF | OFF | OFF | OFF |
| PS1 ABNORMAL CONDITION | OFF | ON | OFF | ON | ON | OFF |
| PS ABNORMAL CONDITION | ON | OFF | ON | OFF | OFF | ON |
| CKT1 SHORT CIRCUIT CONDITION | OFF | ON | OFF | OFF | OFF | OFF |
| CKT2 SHORT CIRCUIT CONDITION | ON | OFF | OFF | OFF | OFF | OFF |

POWER SWITCHING CIRCUIT

CROSS REFERENCE TO RELATED APPLICATION

This application is based on Japanese Patent Application No. 2023-207970 filed on Dec. 8, 2023, the disclosure of which is incorporated herein by reference.

TECHNICAL FIELD

The present disclosure relates to a power switching circuit.

BACKGROUND

As a power switching circuit, a multiple battery switching circuit selectively interconnects one of batteries with a load or charger.

SUMMARY

A power switching circuit is connected to a first power supply, a second power supply, a first circuit and a second circuit. The power switching circuit includes: a first main path to supply power from the first power supply to the first circuit; a second main path to supply power from the second power supply to the second circuit; a first switching path to switch a power supply source to the first circuit from the first power supply to the second power supply when the first power supply is faulty; a second switching path to switch a power supply source to the second circuit from the second power supply to the first power supply when the second power supply is faulty; and a control circuit that forms a power supply path by controlling each of the first main path, the second main path, the first switching path, and the second switching path in either a conducting or non-conducting state. When one of the first circuit and the second circuit fails, the control circuit forms a power supply path that does not affect the operation of the other circuit.

BRIEF DESCRIPTION OF DRAWINGS

FIG. 7 is a view showing on/off of MOSFET in normal, power failure, and short circuit conditions.

FIG. 8 is a view showing on/off of MOSFET during an open fault.

DETAILED DESCRIPTION

Figure 1:
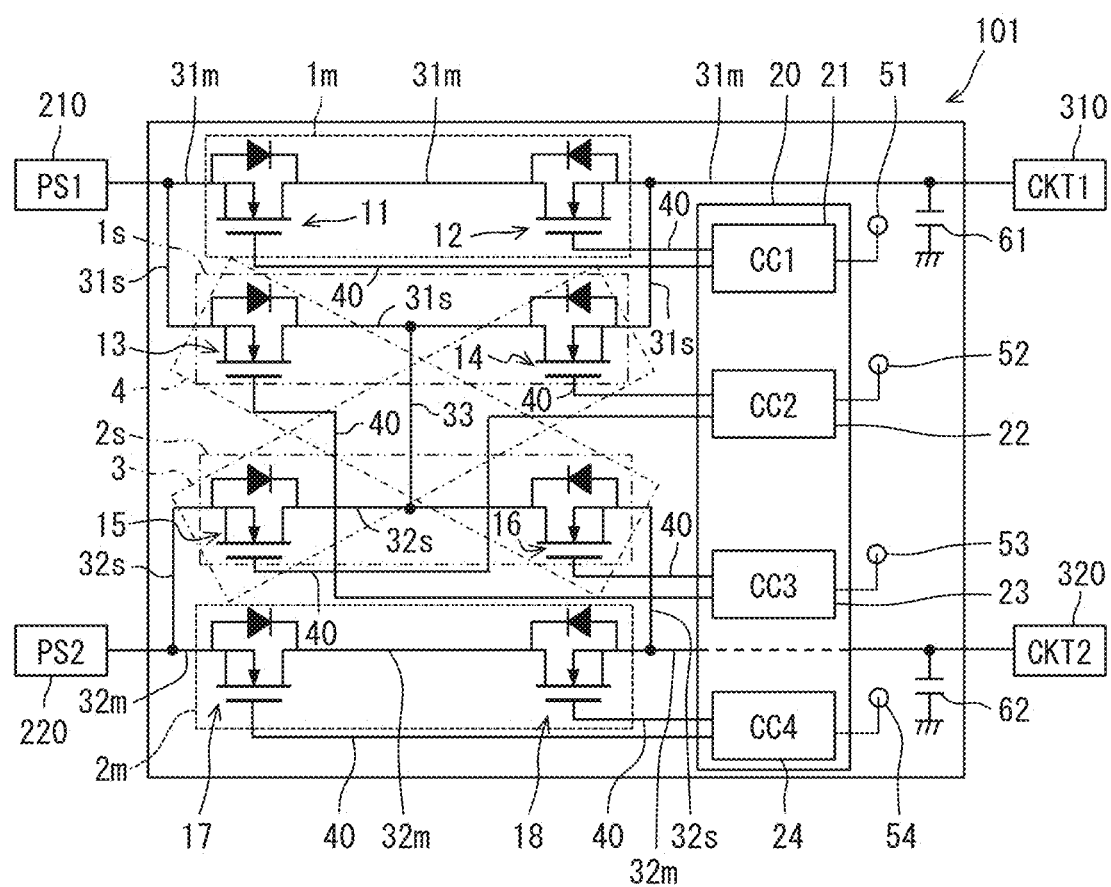
FIG. 1 is a circuit diagram illustrating a schematic configuration of a power switching circuit according to a first embodiment.

A multiple battery switching circuit is described as a power switching circuit. The multiple battery switching circuit selectively interconnects one of the batteries with a load or charger.

The power switching circuit has: a first path that supplies power from a first power supply to a first circuit; a second path that supplies power from a second power supply to a second circuit; a third path that supplies power from the first power supply to the second circuit; and a fourth path that supplies power from the second power supply to the first circuit. In such a configuration, if the first circuit has a short circuit fault, while power is supplied to the second circuit, a short circuit current may flow from both the first power supply and the second power supply to the first circuit. In this case, the power switching circuit cannot supply power to the second circuit, and the operation of the second circuit cannot be maintained. Further improvements are required in a power switching circuit in the above-described viewpoints or in other viewpoints not mentioned.

The present disclosure provides a power switching circuit that can maintain operation of a circuit that is not faulty.

A power switching circuit is connected to a first power supply, a second power supply, a first circuit and a second circuit. The power switching circuit includes: a first main path to supply power from the first power supply to the first circuit; a second main path to supply power from the second power supply to the second circuit; a first switching path to switch a power supply source to the first circuit from the first power supply to the second power supply when the first power supply is faulty; a second switching path to switch a power supply source to the second circuit from the second power supply to the first power supply when the second power supply is faulty; and a control circuit that forms a power supply path by controlling each of the first main path, the second main path, the first switching path, and the second switching path in either a conducting or non-conducting state. When one of the first circuit and the second circuit fails, the control circuit forms a power supply path that does not affect the operation of the other circuit.

According to the power switching circuit, if a failure occurs in one of the first and second circuits, a power supply path is formed that does not affect the operation of the other circuit. Therefore, the power switching circuit can maintain the operation of the other of the first and second circuits that is not faulty.

The disclosed aspects in this specification adopt different technical solutions from each other in order to achieve their respective objectives. The objectives, features, and effects disclosed herein are further clarified by reference to the subsequent detailed description and accompanying drawings.

Embodiments for implementing the present disclosure will be described with reference to the drawings. In each embodiment, portions corresponding to those described in the preceding embodiment are denoted by the same reference numerals, and redundant descriptions will be omitted in some cases. In each embodiment, in a case where only a part of the configuration is described, the other part of the configuration may be applied with reference to the other embodiment described above.

First Embodiment

A power switching circuit 101 according to a first embodiment will be described with reference to FIG. 1 to FIG. 10. The power switching circuit 101 is mountable, for example, on a mobile object. Examples of the mobile object include vehicles such as electric car, hybrid car, and fuel cell car, flying objects such as electric vertical take-off and landing aircraft and drone, ships, construction machinery, and agricultural machinery.

The power switching circuit 101 is connected to the first power supply 210 and the second power supply 220. The power switching circuit 101 is connected to the first circuit 310 and the second circuit 320. The power switching circuit 101 provides a power supply path to supply power from the first power supply 210 to the first circuit 310. The power switching circuit 101 provides a power supply path to supply power from the second power supply 220 to the second circuit 320. In the drawing, the first power supply 210 is described as PS1, the second power supply 220 is described as PS2, the first circuit 310 is described as CKT1, and the second circuit 320 is described as CKT2.

The power switching circuit 101 switches the power supply path for the first circuit 310 and the second circuit 320. That is, the power switching circuit 101 switches the power supply for the first circuit 310 from the first power supply 210 to the second power supply 220, and switches the power supply for the second circuit 320 from the second power supply 220 to the first power supply 210. Thus, the power switching circuit 101 has a switching function. It can also be said that the power switching circuit 101 switches the power supplies from each other.

Each of the first power supply 210 and the second power supply 220 can employ rechargeable secondary battery or non-rechargeable primary battery. The first power supply 210 and the second power supply 220 may both be secondary batteries or primary batteries, or one may be a secondary battery and the other may be a primary battery. A rechargeable secondary battery can be considered a power source that is allowed to be recharged. A primary battery that cannot be recharged can be said to be a charging-prohibited power source.

Each of the first circuit 310 and the second circuit 320 is connected to a load, and is an electronic controller that controls the load.

Figure 2:
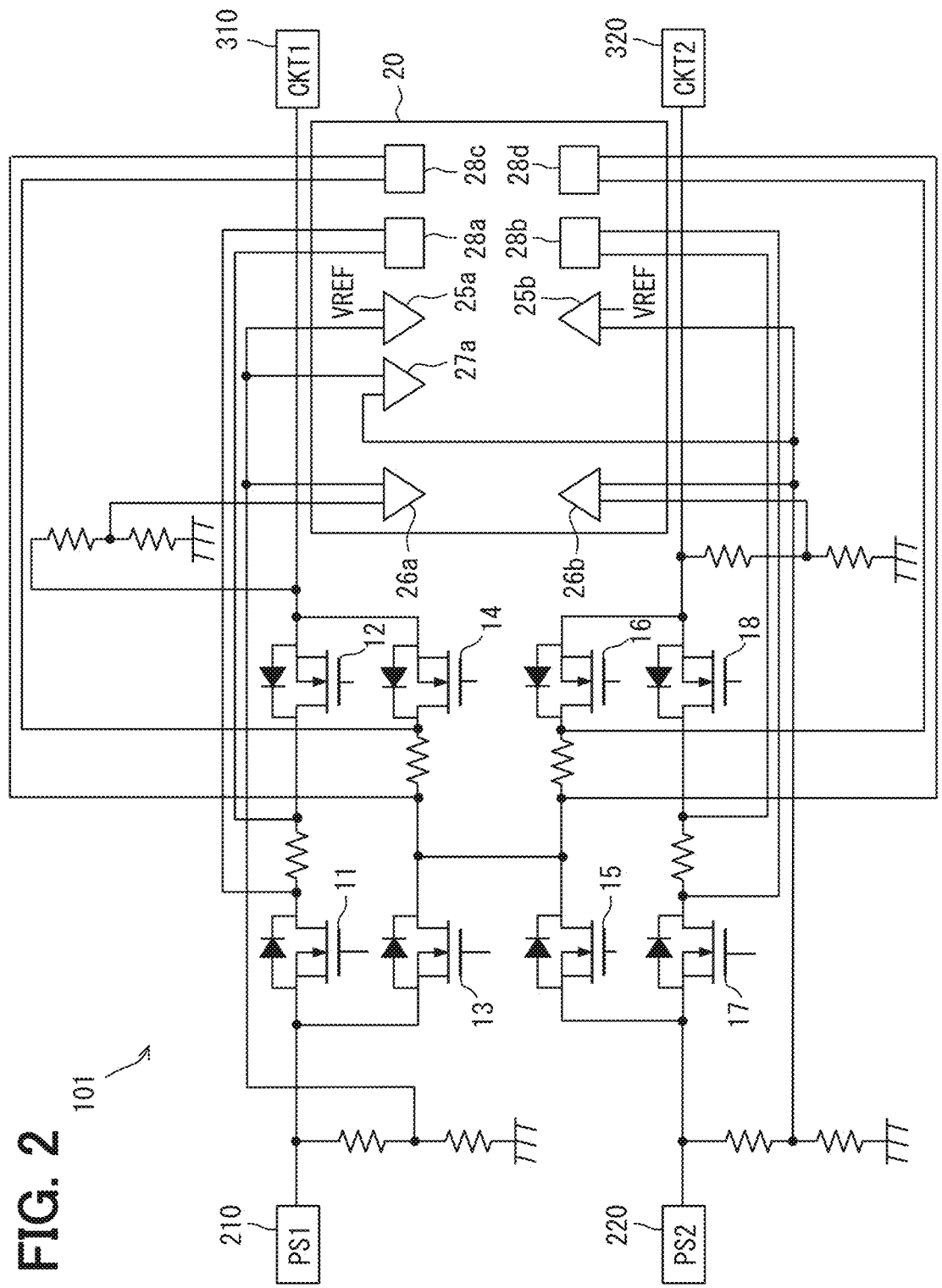
FIG. 2 is a circuit diagram showing processing operation of a control circuit.
Figure 3:
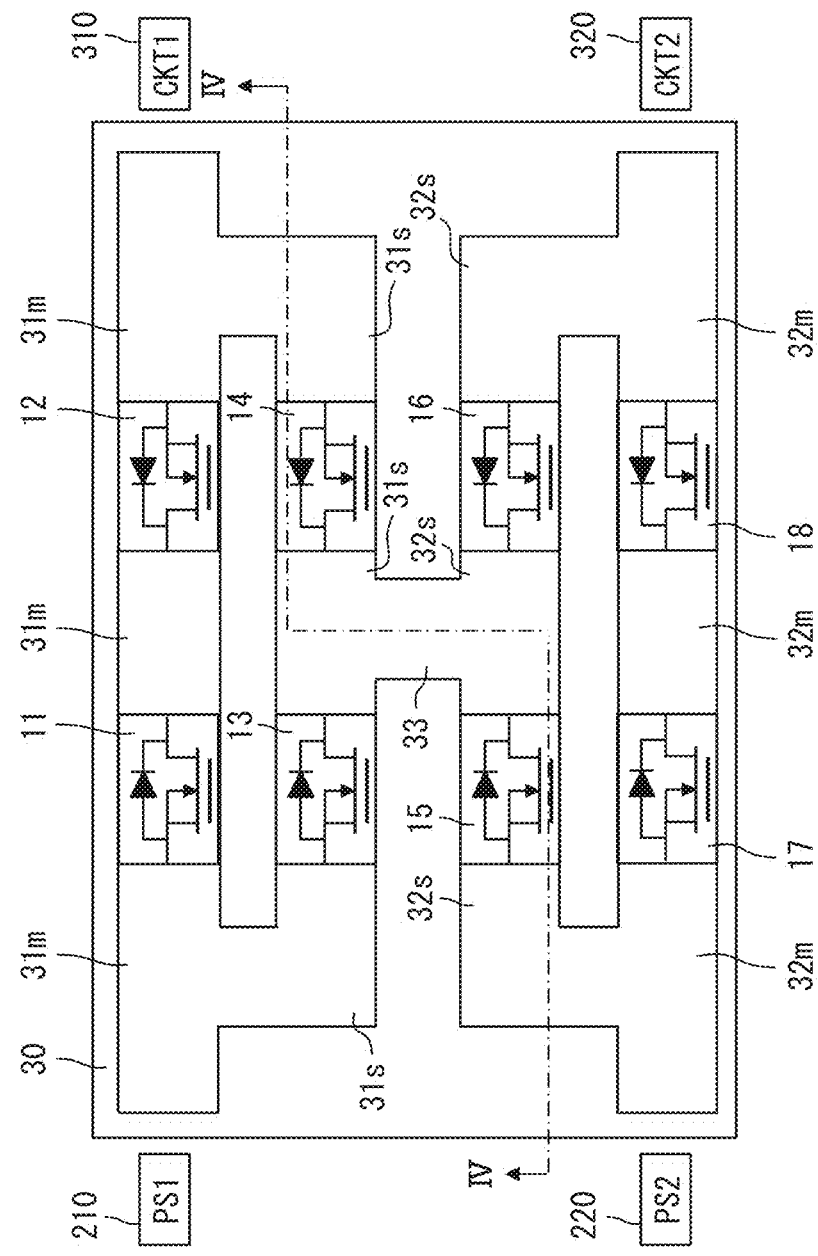
FIG. 3 is a plan view of the power switching circuit in the first embodiment.

FIGS. 1, 2, and 3 are used to describe the configuration of the power switching circuit 101. The power switching circuit 101 has MOSFETs 11 to 18, a control circuit 20, a circuit board 30, and capacitors 61, 62. In the drawings, each MOSFET 11 to 18 is described as SW1 to SW8.

The MOSFETs 11 to 18 are mounted on the circuit board 30, which will be described later. The MOSFETs 11 to 18 are connected to the wiring provided on the circuit board 30. The MOSFETs 11 to 18 include body diodes respectively.

The first MOSFET 11 and the second MOSFET 12 are connected to each other by drain electrodes. The first MOSFET 11 and the second MOSFET 12 are connected to each other by the cathodes of the body diodes.

The third MOSFET 13 and the fourth MOSFET 14 are connected to each other by drain electrodes. The third MOSFET 13 and the fourth MOSFET 14 are connected to each other by the cathodes of the body diodes.

The fifth MOSFET 15 and the sixth MOSFET 16 are connected to each other by drain electrodes. The fifth MOSFET 15 and sixth MOSFET 16 are connected to each other by the cathodes of the body diodes.

The seventh MOSFET 17 and the eighth MOSFET 18 are connected between drain electrodes. The seventh MOSFET 17 and the eighth MOSFET 18 are connected to each other by the cathodes of the body diodes.

In this embodiment, Nch MOSFETs are used as the MOSFETs 11 to 18. Alternatively, Pch MOSFETs may be used as the MOSFETs 11 to 18. In this case, the two corresponding MOSFETs are connected to each other by the source electrodes. The two corresponding MOSFETs are, for example, the first MOSFET 11 and the second MOSFET 12, or the third MOSFET 13 and the fourth MOSFET 14.

Figure 4:
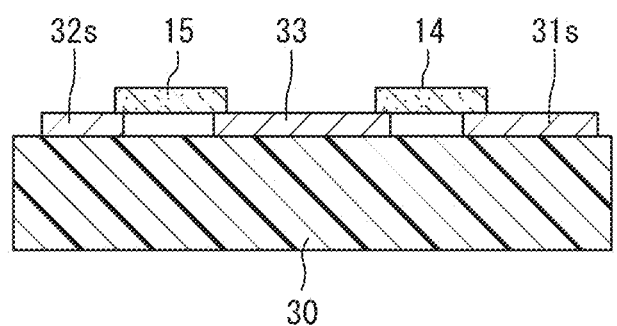
FIG. 4 is a cross-sectional view taken along a line IV-IV in FIG. 3.

As shown in FIG. 3 and FIG. 4, the circuit board 30 has conductive wiring formed on an insulating substrate. The circuit board 30 is mounted with the MOSFETs 11 to 18. The wiring includes a first main wiring 31*m*, a first sub-wiring 31*s*, a second main wiring 32*m*, a second sub-wiring 32*s*, a switching wiring 33, and a gate wiring 40. In FIG. 3 and FIG. 4, the gate wiring 40 is omitted in illustration.

At least the first main wiring 31*m*, the first sub-wiring 31*s*, the second main wiring 32*m*, the second sub-wiring 32*s*, and the switching wiring 33, which are power supply wiring, can be provided without crossing each other in three dimensions. It can also be said that power supply wirings can be provided without straddling each other. Therefore, the power supply wiring can be formed on the same side of the insulating substrate. In other words, the power supply wiring is formed without via (interlayer connection material). It can be said that the first main path 1*m*, the second main path 2*m*, the first switching path 3, and the second switching path 4, which will be explained later, are formed on the same plane of the circuit board 30. As an example, in this embodiment, a power line is formed on the surface layer of the insulating substrate.

Therefore, the power switching circuit 101 can simplify the routing of the gate wiring 40. In this embodiment, the circuit board 30 has the gate wiring 40 as an example of signal wiring. However, the circuit board 30 may have other signal wiring in addition to the gate wiring 40. In this configuration, the power switching circuit 101 can also simplify the routing of signal wiring other than gate wiring 40. Furthermore, the arrangement of the circuit components of the power switching circuit 101 can be simplified and the board area can be effectively utilized.

Furthermore, because the power switching circuit 101 has the power supply wiring on the surface layer, the rise in temperature of the circuit board 30 can be suppressed, compared with a configuration where the power supply wiring is provided in the inner layer. The power switching circuit 101 has the MOSFETs 11 to 18 on the same side of the circuit board 30. Therefore, the power switching circuit 101 can simplify the heat dissipation structure when heat dissipation of the MOSFETs 11 to 18 is required.

The first MOSFET 11 and the second MOSFET 12 are connected to the first main wiring 31*m*. The first main wiring 31*m* connects between the drain electrodes of the first MOSFET 11 and the second MOSFET 12. The first main wiring 31*m* is connected to the source electrode of the first MOSFET 11 and the source electrode of the second MOSFET 12. The source electrode of the first MOSFET 11 is connected to the first power supply 210 via the first main wiring 31*m*. The source electrode of the second MOSFET 12 is connected to the first circuit 310 via the first main wiring 31*m*.

The first main path 1*m* includes the first MOSFET 11, the second MOSFET 12, and the first main wiring 31*m*. The first main path 1*m* is connected to the first power supply 210 at one end and to the first circuit 310 at the other end. The first main path 1*m* is configured to supply power from the first power supply 210 to the first circuit 310. In other words, the first main path 1*m* is the power supply path from the first power supply 210 to the first circuit 310 when the first MOSFET 11 and the second MOSFET 12 are turned on. The first MOSFET 11 and the second MOSFET 12 connected by the first main wiring 31*m* can be considered as a first main switch section.

The third MOSFET 13 and the fourth MOSFET 14 are connected to the first sub-wiring 31*s*. The first sub-wiring 31*s* connects between the drain electrodes of the third MOSFET 13 and the fourth MOSFET 14. The first sub-wiring 31*s* is connected to the source electrode of the third MOSFET 13 and the source electrode the fourth MOSFET 14. The source electrode of the third MOSFET 13 is connected to the first power supply 210 via the first sub-wiring 31*s*. The source electrode of the fourth MOSFET 14 is connected to the first circuit 310 via the first sub-wiring 31*s*.

The first sub-path 1*s* includes the third MOSFET 13, the fourth MOSFET 14, and the first sub-wiring 31*s*. The first sub-path 1*s* is redundant to the first main path 1*m*. The first sub-path 1*s* can be used as a power supply path instead of the first main path 1*m* when the third MOSFET 13 and the fourth MOSFET 14 are turned on.

The seventh MOSFET 17 and the eighth MOSFET 18 are connected to the second main wiring 32*m*. The second main wiring 32*m* connects between the drain electrodes of the seventh MOSFET 17 and the eighth MOSFET 18. The second main wiring 32*m* is connected to the source electrode of the seventh MOSFET 17 and the source electrode of the eighth MOSFET 18. The source electrode of the seventh MOSFET 17 is connected to the second power supply 220 via the second main wiring 32*m*. The source electrode of the eighth MOSFET 18 is connected to the second circuit 320 via the second main wiring 32*m*.

The second main path 2*m* includes the seventh MOSFET 17, the eighth MOSFET 18, and the second main wiring 32*m*. The second main path 2*m* is connected to the second power supply 220 at one end and to the second circuit 320 at the other end. The second main path 2*m* is configured to supply power from the second power supply 220 to the second circuit 320. In other words, the second main path 2*m* is the power supply path from the second power supply 220 to the second circuit 320 when the seventh MOSFET 17 and the eighth MOSFET 18 are turned on. The seventh MOSFET 17 and the eighth MOSFET 18 connected by the second main wiring 32*m* can be considered as a second main switch section.

The fifth MOSFET 15 and the sixth MOSFET 16 are connected to the second sub-wiring 32*s*. The second sub-wiring 32*s* connects between the drain electrodes of the fifth MOSFET 15 and the sixth MOSFET 16. The second sub-wiring 32*s* is connected to the source electrode of the fifth MOSFET 15 and the source electrode of the sixth MOSFET 16. The source electrode of the fifth MOSFET 15 is connected to the second power supply 220 via the second sub-wiring 32*s*. The source electrode of the sixth MOSFET 16 is connected to the second circuit 320 via the second sub-wiring 32*s*.

The second sub-path 2*s* includes the fifth MOSFET 15, the sixth MOSFET 16, and the second sub-wiring 32*s*. The second sub-path 2*s* is redundant to the second main path 2M. The second sub-path 2*s* can be used as a power supply path instead of the second main path 2*m* when the fifth MOSFET 15 and the sixth MOSFET 16 are turned on.

The first sub-wiring 31*s* connecting between the drain electrodes of the third MOSFET 13 and the fourth MOSFET 14 is connected to the switching wiring 33. The second sub-wiring 32*s* connecting between the drain electrodes of the fifth MOSFET 15 and the sixth MOSFET 16 is connected to the switching wiring 33. Thus, the switching wiring 33 connects the first sub-path 1*s* and the second sub-path 2*s*.

The fourth MOSFET 14 and the fifth MOSFET 15 are connected to each other by the cathodes of the body diodes via the switching wiring 33. The first switching path 3 includes the fourth MOSFET 14, the fifth MOSFET 15, a part of the second sub-wiring 32*s*, a part of the first sub-wiring 31*s*, and the switching wiring 33. The first switching path 3 is connected to the second power supply 220 at one end and to the first circuit 310 at the other end. The first switching path 3 is configured to switch the power supply source to the first circuit 310 from the first power supply 210 to the second power supply 220 when the first power supply 210 is faulty. In other words, the power supply path to the first circuit 310 is configured to be switchable from the first main path 1*m* to the first switching path 3.

The third MOSFET 13 and the sixth MOSFET 16 are connected to each other by the cathodes of the body diodes via the switching wiring 33. The second switching path 4 includes the third MOSFET 13, the sixth MOSFET 16, a part of the first sub-wiring 31*s*, a part of the second sub-wiring 32*s*, and the switching wiring 33. The second switching path 4 is connected to the first power supply 210 at one end and to the second circuit 320 at the other end. The second switching path 4 is configured to switch the power supply source to the second circuit 320 from the second power supply 220 to the first power supply 210 when the second power supply 220 is faulty. In other words, the power supply path to the second circuit 320 is configured to be switchable from the second main path 2*m* to the second switching path 4.

The first main wiring 31*m*, which connects the first switching path 3 to the first circuit 310, is connected to the first capacitor 61. The first capacitor 61 is connected to the first main wiring 31*m* at one end and to ground at the other end. Similarly, the second main wiring 32*m*, which connects the second switching path 4 to the second circuit 320, is connected to the second capacitor 62. The second capacitor 62 is connected to the second main wiring 32*m* at one end and to ground at the other end. This allows the power switching circuit 101 to reduce voltage fluctuations when switching power supply paths. However, the power switching circuit 101 may not have the capacitor 61, 62.

As shown in FIG. 1, the control circuit 20 is connected to the first main path 1*m*, the second main path 2*m*, the first switching path 3, and the second switching path 4. The control circuit 20 forms a power supply path by controlling each of the first main path 1*m*, the second main path 2*m*, the first switching path 3, and the second switching path 4 to either conductive or non-conductive state (on and off). The control circuit 20 forms a power supply path by controlling each of the first sub-path 1*s* and the second sub-path 2*s* in either conductive or non-conductive state. The control circuit 20 controls each path to either the conductive or non-conductive state by controlling the MOSFETs 11 to 18 on and off.

The control circuit 20 forms a power supply path that does not affect the operation of the other circuit in the event of a failure in one of the first circuit 310 and the second circuit 320. The control circuit 20 also forms a power supply path so that power is supplied to the first circuit 310 and the second circuit 320 in the event of a failure in the first main path 1*m* or the second main path 2*m*. These points will be discussed in more detail later.

The control circuit 20 has a first control circuit section 21, a second control circuit section 22, a third control circuit section 23, and a fourth control circuit section 24. Each of the control circuit sections 21 to 24 is individually supplied with operating power. The control circuit section 21 to 24 may be configured to communicate with each other. In the drawings, the control circuit section is described as CC.

The first control circuit section 21 is supplied with operating power from the first operating power supply 51. The first control circuit section 21 is connected to the gate electrodes of the first MOSFET 11 and the second MOSFET 12 via the gate wiring 40. The first control circuit section 21 controls the first MOSFET 11 and the second MOSFET 12 on and off. The first MOSFET 11 and the second MOSFET 12 correspond to a first semiconductor switching element. The first control circuit section 21 corresponds to a first control section. The first MOSFET 11 and the second MOSFET 12 may be hereinafter collectively referred to as a first switch section.

The second control circuit section 22 is supplied with operating power from the second operating power supply 52. The second control circuit section 22 is connected to the gate electrodes of the fourth MOSFET 14 and the fifth MOSFET 15 via the gate wiring 40. The second control circuit section 22 controls the fourth MOSFET 14 and the fifth MOSFET 15 on and off. The fourth MOSFET 14 and the fifth MOSFET 15 correspond to a third semiconductor switching element. The second control circuit section 22 corresponds to a third control section. The fourth MOSFET 14 and the fifth MOSFET 15 may be hereinafter collectively referred to as a third switch section.

The third control circuit section 23 is supplied with operating power from the third operating power supply 53. The third control circuit section 23 is connected to the gate electrodes of the third MOSFET 13 and the sixth MOSFET 16 via the gate wiring 40. The third control circuit section 23 controls the third MOSFET 13 and the sixth MOSFET 16 on and off. The third MOSFET 13 and the sixth MOSFET 16 correspond to a fourth semiconductor switching element. The third control circuit section 23 corresponds to a fourth control section. The third MOSFET 13 and the sixth MOSFET 16 may be hereinafter collectively referred to as a fourth switch section.

The fourth control circuit section 24 is supplied with operating power from the fourth operating power supply 54. The fourth control circuit section 24 is connected to the gate electrodes of the seventh MOSFET 17 and the eighth MOSFET 18 via the gate wiring 40. The fourth control circuit section 24 controls the seventh MOSFET 17 and the eighth MOSFET 18 on and off. The seventh MOSFET 17 and the eighth MOSFET 18 correspond to a second semiconductor switching element. The fourth control circuit section 24 corresponds to a second control section. The seventh MOSFET 17 and the eighth MOSFET 18 may be hereinafter collectively referred to as a second switch section.

Thus, the power switching circuit 101 has the control circuit sections 21 to 24 respectively for the switch sections. Therefore, the power switching circuit 101 can supply power to each of the first circuit 310 and the second circuit 320 even at a single failure time.

The power switching circuit 101 has the operating power supplies 51 to 54 respectively connected to the control circuit sections 21 to 24. In other words, each of the control circuit sections 21 to 24 is individually supplied with operating power. Therefore, the power switching circuit 101 can keep the switching function when a power failure is generated, compared with a configuration where a common operating power supply is connected to the control circuit sections 21 to 24.

Each of the control circuit sections 21 to 24 may be supplied with operating power from the first power supply 210 and the second power supply 220. In this case, it is preferable that the first control circuit section 21 and the second control circuit section 22 have different power supplies and that the third control circuit section 23 and the fourth control circuit section 24 have different power supplies.

For example, the first control circuit section 21 is supplied with operating power from the first power supply 210, the second control circuit section 22 is supplied with operating power from the second power supply 220, the third control circuit section 23 is supplied with operating power from the first power supply 210, and the fourth control circuit section 24 is supplied with operating power from the second power supply 220 (first supply mode). Alternatively, for each of the control circuit sections 21 to 24, the first power supply 210 and the second power supply 220 may be OR (parallel) connected. In this case, each of the control circuit sections 21 to 24 is supplied with operating power from the first power supply 210 or the second power supply 220 with the higher voltage (second supply mode). Even with this configuration, it is possible to suppress the failure to supply power as described above.

The first control circuit section 21 may be supplied with operating power from the second power supply 220, the second control circuit section 22 from the first power supply 210, the third control circuit section 23 from the second power supply 220, and the fourth control circuit section 24 from the first power supply 210. However, this mode of supplying operating power is accompanied by the following limitations.

When the first power supply 210 is faulty (low voltage), the first circuit 310 is powered from the second power supply 220 with the MOSFETs 14 and 15 turned on. When the operating power supply 52 of the second control circuit section 22 is connected to the first power supply 210, the MOSFETs 14 and 15 can be turned on if the voltage of the first power supply 210 is higher than a predetermined voltage at which the second control circuit section 22 can operate (for example, 3 V). Therefore, the second power supply 220 can supply power to the first circuit 310.

However, if the voltage of the first power supply 210 drops below the predetermined voltage at which the second control circuit section 22 can operate, the MOSFETs 14 and 15 cannot be turned on. Therefore, power cannot be supplied from the second power supply 220 to the first circuit 310.

If the first power supply 210 is faulty, the second circuit 320 is powered from the second power supply 220 with the MOSFETs 17 and 18 turned on. When the operating power supply 54 of the fourth control circuit section 24 is connected to the first power supply 210, the MOSFETs 17 and 18 can be turned on if the voltage of the first power supply 210 is higher than a predetermined voltage at which the fourth control circuit section 24 can operate (for example, 3 V). Therefore, the second power supply 220 can supply power to the second circuit 320.

However, if the voltage of the first power supply 210 drops below the predetermined voltage at which the fourth control circuit section 24 can operate, the MOSFETs 17 and 18 cannot be turned on. Therefore, power cannot be supplied from the second power supply 220 to the second circuit 320.

If the second power supply 220 is faulty (low voltage), the first circuit 310 is powered from the first power supply 210 with the MOSFETs 11 and 12 turned on. When the operating power supply 51 of the first control circuit section 21 is connected to the second power supply 220, the MOSFETs 11 and 12 can be turned on if the voltage of the second power supply 220 is higher than the predetermined voltage at which the first control circuit section 21 can operate (for example, 3 V). Therefore, power can be supplied to the first circuit 310 from the first power supply 210.

However, if the voltage of the second power supply 220 drops below the predetermined voltage at which the first control circuit section 21 can operate, the MOSFETs 11 and 12 cannot be turned on. Therefore, power cannot be supplied from the first power supply 210 to the first circuit 310.

If the second power supply 220 is faulty, the second circuit 320 is powered from the first power supply 210 with the MOSFETs 13 and 16 turned on. When the operating power supply 53 of the third control circuit section 23 is connected to the second power supply 220, the MOSFETs 13 and 16 can be turned on if the voltage of the second power supply 220 is higher than the predetermined voltage at which the third control circuit section 23 can operate (for example, 3 V). Therefore, power can be supplied to the second circuit 320 from the first power supply 210.

However, if the voltage of the second power supply 220 drops below the predetermined voltage at which the third control circuit section 23 can operate, the MOSFETs 13 and 16 cannot be turned on. Therefore, power cannot be supplied from the first power supply 210 to the second circuit 320. Therefore, the first or second supply mode is preferred for the operating power.

The switching between the power supplies 210 and 220 for each of the circuits 310 and 320 will be explained later. A faulty of the first power supply 210 represents a situation where the voltage drops below the predetermined voltage at which the first circuit 310 can operate (e.g., 8 V). A faulty of the second power supply 220 represents a situation where the voltage drops below the predetermined voltage at which the second circuit 320 can operate (e.g., 8 V).

The control circuit 20 may be provided common to the MOSFETs 11 to 18. In this case, the control circuit 20 is supplied with operating power from a single power source. The control circuit 20 may have the second control circuit section 22 and the third control circuit section 23 in common. In this case, the common control circuit, which also serves as the first control circuit section 21, the fourth control circuit section 24, the second control circuit section 22, and the third control circuit section 23, is powered with the operating power by the two power supplies which are OR (parallel) connected.

As shown in FIG. 2, the control circuit 20 has a power supply determiner 25a, 25b, a both-end voltage determiner 26a, 26b, a voltage difference determiner 27a, and an overcurrent determiner 28a-28d. Each determiner may be provided in each of the control circuit section 21 to 24, or may be provided common to the control circuit sections 21 to 24. The first control circuit section 21 and the second control circuit section 22 determine the status of the first main path 1m, the first switching path 3, the power supply 210, 220 and the circuit 310, 320 based on the determiners 25a-28a, 28c. The third control circuit section 23 and the fourth control circuit section 24 determine the status of the second main path 2m, the second switching path 4, the power supply 210, 220 and the circuit 310, 320 based on the determiners 25b, 27a, 26b, 28b, 28d. The configuration for determining the status of the main path 1m, 2m, the switching path 3, 4, the power supply 210, 220, and the circuit 310, 320 is not limited to the following. For example, the status of the main path 1m, 2m and the switching path 3, 4 represents a disconnection or MOSFET failure.

The first power supply determiner 25a is configured to determine the voltage drop of the first power supply 210. The first power supply determiner 25a outputs the result of the comparison between the voltage of the first power supply 210 and the voltage threshold (VREF). The control circuit section 21, 22 determines whether the voltage of the first power supply 210 is low or not based on the output value of the first power supply determiner 25a.

The second power supply determiner 25b is configured to determine the voltage drop of the second power supply 220. The second power supply determiner 25b outputs the result of the comparison between the voltage of the second power supply 220 and the voltage threshold (VREF). The control circuit section 23, 24 determines whether the voltage of the second power supply 220 is low or not based on the output value of the second power supply determiner 25b.

The first both-end voltage determiner 26a is configured to determine the difference between the two end voltages of the first main switch section. The first both-end voltage determiner 26a outputs the result of the comparison between the upstream and downstream voltages of the first main switch section. The upstream side is adjacent to the first power supply 210, and the downstream side is adjacent to the first circuit 310.

The control circuit section 21, 22, 23 determines the difference in voltage between both ends of the first main switch section based on the output value of the first both-end voltage determiner 26a. The control circuit section 21, 22 then determines a failure (open fault) of either the first MOSFET 11 or the second MOSFET 12 based on the difference in voltage between the two ends. The control circuit section 21, 22 considers that either the first MOSFET 11 or the second MOSFET 12 has an open fault when the difference in voltage between the two end is greater than a predetermined value.

The second both-end voltage determiner 26b is configured to determine the difference in voltage between the two ends of the second main switch section. The second both-end voltage determiner 26b outputs the result of the comparison between the upstream and downstream voltages of the second main switch section. The upstream side is adjacent to the second power supply 220, and the downstream side is adjacent to the second circuit 320.

The control circuit section 22, 23, 24 determines the difference in voltage at both ends of the second main switch section based on the output value of the second both-end voltage determiner 26b. The control circuit section 23, 24 then determines an open fault of either the seventh MOSFET 17 or the eighth MOSFET 18 based on the difference in voltage between the two ends. The control circuit section 23, 24 considers that either the seventh MOSFET 17 or the eighth MOSFET 18 has an open fault when the difference in voltage between the two ends is greater than a predetermined value. The predetermined value here can also be referred to as an open fault determination value.

The voltage difference determiner 27a is configured to determine a magnitude relationship between the voltage of the first power supply 210 and the voltage of the second power supply 220. The voltage difference determiner 27a outputs the result of the comparison between the voltage of the first power supply 210 and the voltage of the second power supply 220. The control circuit section 21-24 determines the relationship between the voltage of the first power supply 210 and the voltage of the second power supply 220 based on the output value of the voltage difference determiner 27a.

The first overcurrent determiner 28a is configured to determine the overcurrent in the first main path 1m. The first overcurrent determiner 28a outputs the voltage at both ends of a current detection resistor disposed in the first main wiring 31m. The control circuit section 21, 22 calculates the current value of the first main path 1m based on the resistance and both end voltages of the current detection resistor. The control circuit section 21, 22 determines that an overcurrent is flowing when the current value is above the current threshold. When the current value is above the current threshold, the control circuit section 21, 22 determines that an overcurrent is flowing in the first circuit 310 due to a short circuit in the first circuit 310.

The second overcurrent determiner 28b is configured to determine the overcurrent in the second main path 2m. The second overcurrent determiner 28b outputs the voltage at both ends of a current detection resistor in the second main wiring 32m. The control circuit section 23, 24 calculates the current value of the second main path 2m based on the resistance and both end voltages of the current detection resistor. The control circuit section 23, 24 determines that an overcurrent is flowing when the current value is above the current threshold. When the current value is above the current threshold, the control circuit section 23, 24 determines that an overcurrent is flowing in the second circuit 320 due to a short circuit in the second circuit 320.

The third overcurrent determiner 28c is configured to determine the overcurrent in the first sub-path 1s and the first switching path 3. The third overcurrent determiner 28c outputs the voltage at both ends of a current detection resistor in the first sub-wiring 31s. The control circuit section 21, 22 calculates the current value of the first sub-path 1s based on the resistance and both end voltages of the current detection resistor. The control circuit section 21, 22 determines that an overcurrent is flowing when the current value is above the current threshold. When the current value is above the current threshold, the control circuit section 21, 22 determines that an overcurrent is flowing in the first circuit 310 due to a short circuit in the first circuit 310.

The fourth overcurrent determiner 28d is configured to determine the overcurrent in the second sub-path 2s and second switching path 4. The fourth overcurrent determiner 28d outputs the voltage at both ends of a current detection resistor in the second sub-wiring 32s. The control circuit section 23, 24 calculates the current value of the second sub-path 2s based on the resistance and both end voltages of the current detection resistor. The control circuit section 23, 24 determines that an overcurrent is flowing when the current value is above the current threshold. When the current value is above the current threshold, the control circuit section 23, 24 determines that an overcurrent is flowing in the second circuit 320 due to a short circuit in the second circuit 320.

Each of the control circuit sections 21 to 24 can be made of an ideal diode controller. The power switching circuit 101 can be designed easily by using the ideal diode controller as the control circuit section 21-24.

The operation of the power switching circuit 101 is explained with reference to FIGS. 5 through 10. When power is supplied, the control circuit 20 operates as shown in FIG. 7 under normal condition. In other words, the first control circuit section 21 turns on the first main path 1m by turning on the first MOSFET 11 and the second MOSFET 12. The fourth control circuit section 24 turns on the second main path 2m by turning on the seventh MOSFET 17 and the eighth MOSFET 18.

In FIG. 7, the PS1 abnormal condition indicates that only the first power supply 210 is abnormal. The PS2 abnormal condition indicates that only the second power supply 220 is abnormal. The PS1 abnormal condition represents a voltage drop and a power interruption of the first power supply 210. Similarly, the PS2 abnormal condition represents a voltage drop and a power interruption of the second power supply 220. The CKT1 short circuit condition indicates that only the first circuit 310 has a short-circuit fault. The CKT2 short circuit condition indicates that only the second circuit 320 has a short-circuit fault.

Figure 5:
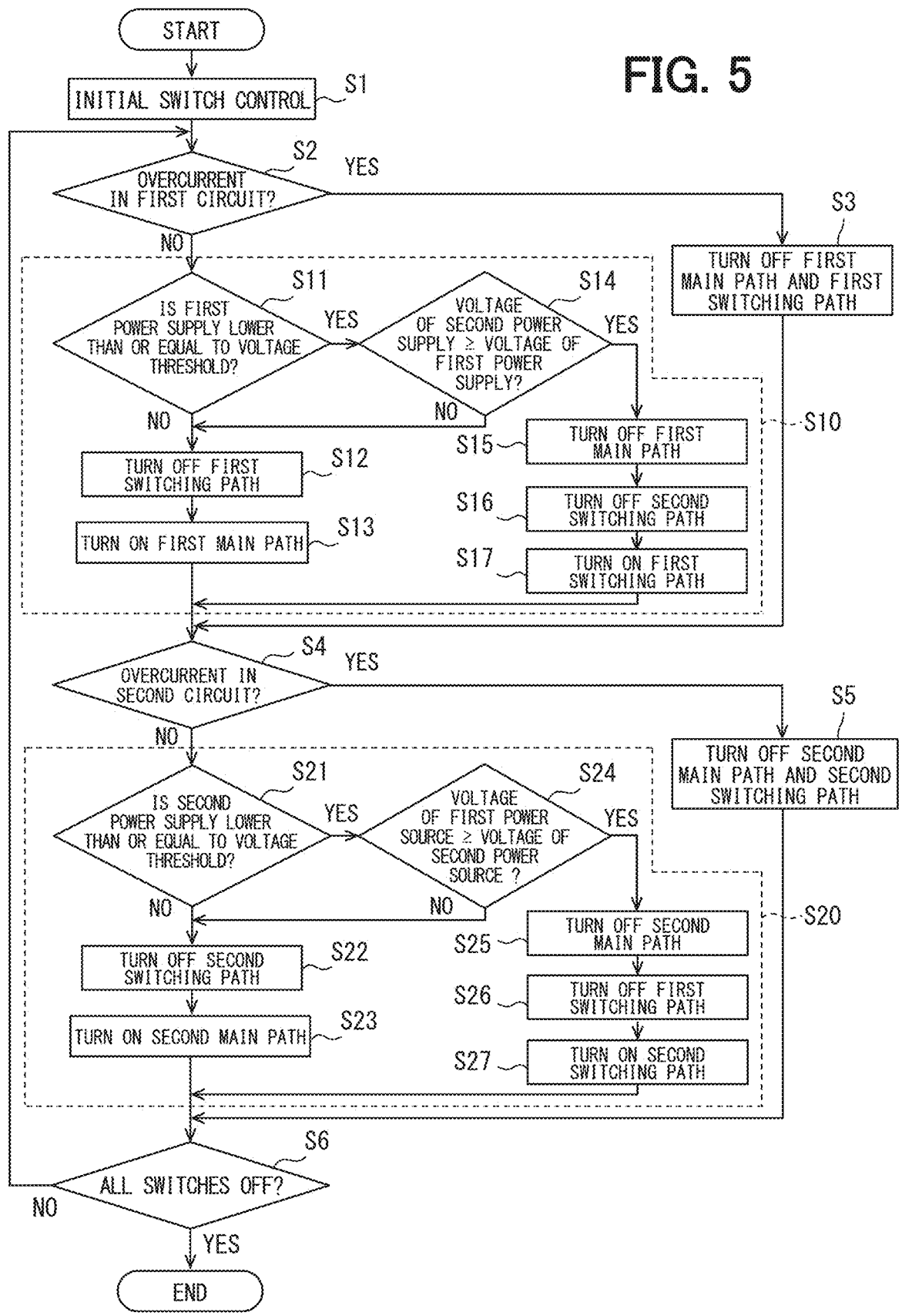
FIG. 5 is a flowchart showing operation of the power switching circuit.
Figure 6:
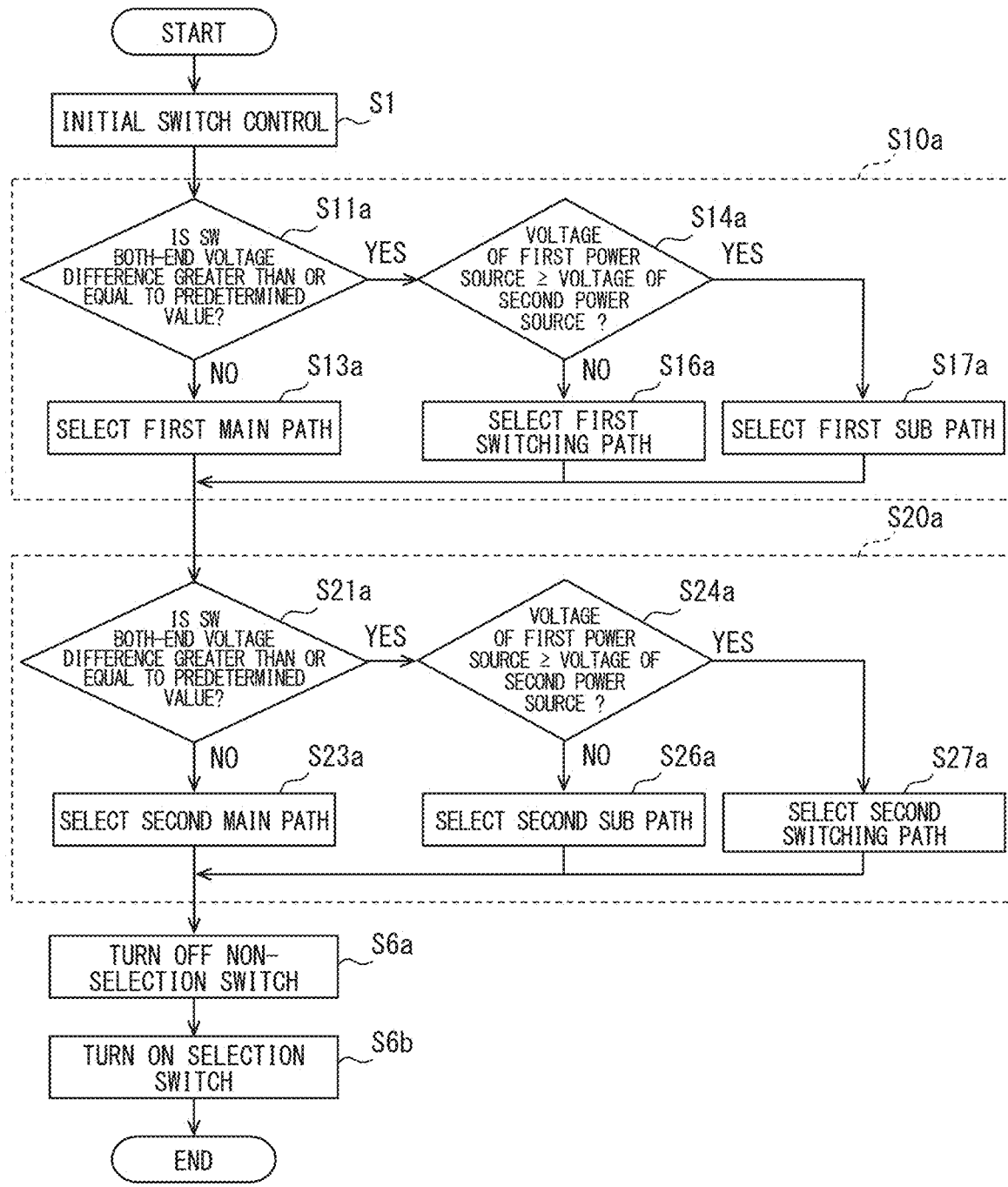
FIG. 6 is a flowchart showing operations when determining an open fault.

The control circuit 20 starts the flowchart shown in FIGS. 5 and 6 at predetermined timing with power supplied. The predetermined timing is, for example, when the vehicle's ignition switch is turned on, when a predetermined cycle occurs, or when an interrupt is received. The control circuit 20 starts the flowchart in FIG. 5 and the flowchart in FIG. 6 at different timings.

First, the flowchart of FIG. 5 will be described. In step S1, an initial switch control is performed. In the situation of step S1, all the MOSFETs 11-18 are turned off. From that state, the control circuit 20 turns on the first main path 1m and the second main path 2m. In other words, the first control circuit section 21 turns on the first MOSFET 11 and the second MOSFET 12. Further, the fourth control circuit section 24 turns on the seventh MOSFET 17 and the eighth MOSFET 18.

In step S2, it is determined whether an overcurrent is flowing in the first circuit 310. The control circuit section 21, 22 determines whether or not an overcurrent is flowing in the first circuit 310 using the output result of the first overcurrent determiner 28a. When it is determined that an overcurrent is flowing, the control circuit section 21, 22 assumes that the first circuit 310 is short-circuited and proceeds to step S3. If it is determined that no overcurrent is flowing, the control circuit section 21, 22 assumes that the first circuit 310 is not shorted and proceeds to step S10. The control circuit 20 may use the output result of the third overcurrent determiner 28c to determine whether or not an overcurrent is flowing in the first circuit 310.

Figure 10:
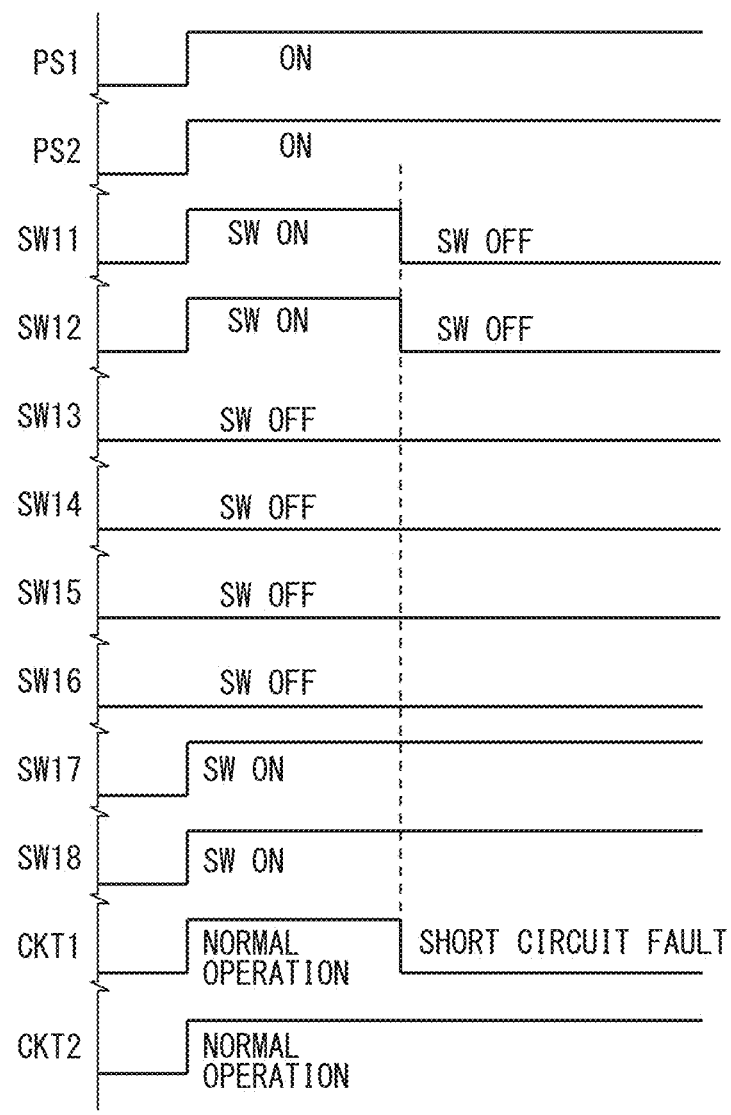
FIG. 10 is a timing chart showing operation of the power switching circuit in a short circuit failure.

In step S3, the first main path 1m is turned off and the first switching path 3 is turned off. As shown in FIG. 10, the first control circuit section 21 turns off the first main path 1m by turning off the first MOSFET 11 and the second MOSFET 12. The second control circuit section 22 also turns off the first switching path 3 by turning off the fifth MOSFET 15 and the fourth MOSFET 14. This allows the power switching circuit 101 to restrict current from continuing to flow in the first circuit 310.

Step S10 is a first switching process. The first switching process includes steps S11 to S17.

In step S11, it is determined whether the first power supply 210 is lower than or equal to the voltage threshold. The control circuit section 21, 22 determines whether the voltage of the first power supply 210 is lower than or equal to the voltage threshold using the output result of the first power supply determiner 25a. If it is determined that the voltage is below the voltage threshold, the control circuit section 21, 22 goes to step S14. If it is determined that the voltage is not below the voltage threshold, the control circuit section 21, 22 goes to step S12.

In step S14, it is determined whether the voltage of the second power supply 220 is larger than or equal to the voltage of the first power supply 210. The control circuit section 21, 22 determines whether the voltage of the second power supply 220 is greater than or equal to the voltage of the first power supply 210 using the output result of the voltage difference determiner 27a. If it is determined that the voltage of the second power supply 220 is greater than or equal to the voltage of the first power supply 210, the control circuit section 21, 22 assumes that the first power supply 210 is abnormal and proceeds to step S15. If it is determined that the voltage of the second power supply 220 is not greater than or equal to the voltage of the first power supply 210, the control circuit section 21, 22 assumes that the first power supply 210 is normal and proceeds to step S12.

In step S12, the first switching path 3 is turned off. The second control circuit section 22 turns off the first switching path 3 by turning off the fifth MOSFET 15 and the fourth MOSFET 14. In step S13, the first main path 1m is turned on. The first control circuit section 21 turns on the first main path 1m by turning on the first MOSFET 11 and the second MOSFET 12. Thus, if the control circuit 20 does not consider the first power supply 210 to be abnormal, the control circuit 20 turns off the first switching path 3 and turns on the first main path 1m.

Note that turning on the path is the same as turning on the MOSFETs 11-18 included in the path. Similarly, turning off the path is synonymous with turning off the MOSFETs 11-18 included in the path.

In step S15, the first main path 1m is turned off. The first control circuit section 21 turns off the first main path 1m by turning off the first MOSFET 11 and the second MOSFET 12.

In step S16, the second switching path 4 is turned off. The third control circuit section 23 turns off the second switching path 4 by turning off the third MOSFET 13 and the sixth MOSFET 16.

Figure 9:
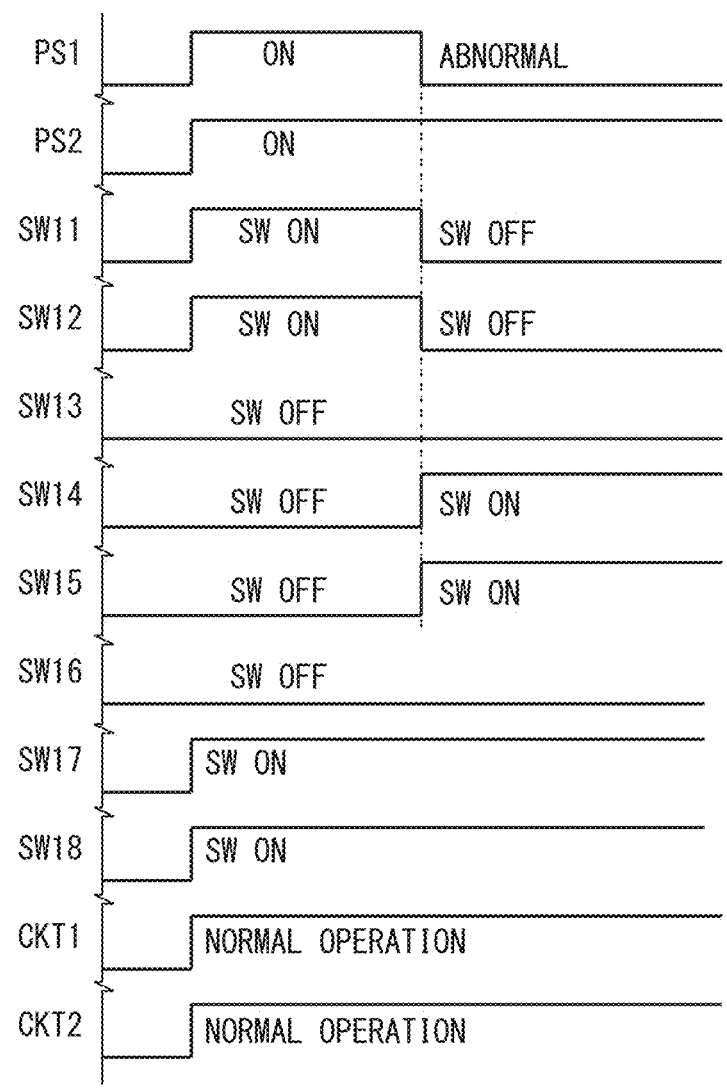
FIG. 9 is a timing chart showing operation of the power switching circuit under normal condition.

In step S17, the first switching path 3 is turned on. The second control circuit section 22 turns on the first switching path 3 by turning on the fifth MOSFET 15 and the fourth MOSFET 14. As shown in FIG. 9, the control circuit 20 turns off the first main path 1m and turns on the first switching path 3 when the first power supply 210 is deemed abnormal.

Thus, the control circuit 20 turns off the other before turning on one of the first switching path 3 and the second switching path 4. This point is explained using a situation where the voltage of the first power supply 210 is 12 V, the voltage of the second power supply 220 is 8 V, and then the voltage of the first power supply 210 drops to 7 V.

Before the voltage of the first power supply 210 drops, the first main path 1m and the second switching path 4 are ON and the second main path 2m and the first switching path 3 are OFF. If the voltage of the first power supply 210 then drops to 7 V, the voltage of the first power supply 210 is lower than that of the second power supply 220.

In case where the voltage of the first power supply 210 drops to 7 V and the second switching path 4 remains ON, the first power supply 210 will receive a large current from the second power supply 220. In other words, the current flows through the body diode of the fifth MOSFET 15 in the off state and the third MOSFET 13 in the on state to the first power supply 210. Therefore, the body diode of the fifth MOSFET 15 may consume more power than its rated power and fail. Therefore, the control circuit 20 always turns off the other switching path before one path is turned on.

In step S4, it is determined whether an overcurrent is flowing in the second circuit 320. The control circuit section 23, 24 determines whether or not an overcurrent is flowing in the second circuit 320 using the output result of the second overcurrent determiner 28b. If the control circuit section 23, 24 determines that an overcurrent is flowing, it is assumed that the second circuit 320 is short-circuited and proceeds to step S5. If the control circuit section 23, 24 determines that no overcurrent is flowing, it is assumed that the second circuit 320 is not shorted and proceeds to step S20. After switching the path, the control circuit 20 may determine whether or not an overcurrent is flowing in the second circuit 320 using the output result of the fourth overcurrent determiner 28d.

In step S5, the second main path 2m is turned off and the second switching path 4 is turned off. The fourth control circuit section 24 turns off the second main path 2m by turning off the seventh MOSFET 17 and the eighth MOSFET 18. The third control circuit section 23 also turns off the second switching path 4 by turning off the third MOSFET 13 and the sixth MOSFET 16. This allows the power switching circuit 101 to restrict current from continuing to flow in the second circuit 320.

Step S20 is a second switching process. The second switching process includes steps S21 to S27.

In step S21, it is determined whether the second power supply 220 is below the voltage threshold. The control circuit section 23, 24 determines whether the voltage of the second power supply 220 is below the voltage threshold using the output result of the second power supply determiner 25b. If the control circuit section 23, 24 determines that the voltage is below the voltage threshold, it goes to step S24. If it is determined that the voltage is not below the voltage threshold, it goes to step S22.

In step S24, it is determined whether the voltage of the first power supply 210 is larger than or equal to that of the second power supply 220. The control circuit section 23, 24 determines whether the voltage of the first power supply 210 is greater than or equal to the voltage of the second power supply 220 using the output result of the voltage difference determiner 27a. If the control circuit section 23, 24 determines that the voltage of the first power supply 210 is greater than or equal to the voltage of the second power supply 220, it is assumed that the second power supply 220 is abnormal and proceeds to step S25. If the control circuit section 23, 24 determines that the voltage of the first power supply 210 is not greater than or equal to the voltage of the second power supply 220, the second power supply 220 is not considered abnormal and proceeds to step S22.

In step S22, the second switching path 4 is turned off. The third control circuit section 23 turns off the second switching path 4 by turning off the third MOSFET 13 and the sixth MOSFET 16. In step S23, the second main path 2m is turned on. The fourth control circuit section 24 turns on the second main path 2m by turning on the seventh MOSFET 17 and the eighth MOSFET 18. Thus, the control circuit 20 turns off the second switching path 4 and turns on the second main path 2m if the second power supply 220 is not considered abnormal.

In step S25, the second main path 2m is turned off. The fourth control circuit section 24 turns off the second main path 2m by turning off the seventh MOSFET 17 and the eighth MOSFET 18.

In step S26, the first switching path 3 is turned off. The second control circuit section 22 turns off the first switching path 3 by turning off the fourth MOSFET 14 and the fifth MOSFET 15. In step S26, the first switching path 3 is turned off for the same reason as in step S16.

In step S27, the second switching path 4 is turned on. The third control circuit section 23 turns on the second switching path 4 by turning on the third MOSFET 13 and the sixth MOSFET 16. If the control circuit 20 considers the second power supply 220 to be faulty, the second main path 2m is turned off and the second switching path 4 is turned on.

Thus, the control circuit 20 forms a power supply path that does not affect the operation of the second circuit 320, even if a short circuit failure occurs in the first circuit 310. Similarly, the control circuit 20 forms a power supply path that does not affect the operation of the first circuit 310, even if a short circuit failure occurs in the second circuit 320.

In other words, the power switching circuit 101 forms a power supply path so that power is supplied to the other circuit in the event of a short circuit failure in one of the first circuit 310 and the second circuit 320. Therefore, the power switching circuit 101 can maintain the operation of one of the first circuit 310 and the second circuit 320 that have not suffered a short circuit fault.

Furthermore, the power switching circuit 101 can supply power to the circuit 310, 320 from the normal power supply, even if one of the power supplies 210 and 220 is faulty. For example, if the first power supply 210 is faulty, the second power supply 220 can supply power to the first circuit 310 and the second circuit 320.

A power switching circuit may have a MOSFET through which the current of both circuits 310, 320 flows, so as to supply power from one power source to both circuits 310, 320. The MOSFET needs to have a power withstand margin to be able to carry the current of both circuits 310, 320.

However, each of the MOSFETs 11 to 18 only carries current for one of the first circuit 310 and the second circuit 320. Therefore, the power switching circuit 101 does not need to have a margin in the power withstanding capability of each MOSFET 11 to 18 to cope with abnormal conditions. In other words, the power switching circuit 101 can be employed without each MOSFET 11-18 having a power withstand margin. Thus, the cost and size of each MOSFET 11-18 can be reduced.

In step S6, it is determined whether all switches are off. The control circuit section 21-24 terminates the flowchart in FIG. 5 when it determines that the corresponding MOSFETs 11 to 18 are off, and returns to step S2 when it determines that the corresponding MOSFETs 11 to 18 are not off. The state in which all switches are off is either when the voltage of the power supply 210, 220 is dropped below a voltage at which all MOSFETs 11-18 cannot be turned on, or when both of the power supply 210 and the power supply 220 are disconnected.

Next, the flowchart of FIG. 6 will be described. In FIG. 6, "a" is assigned to the number of the step that is similar to FIG. 5.

The control circuit 20 performs step S1 as in the flowchart above. Steps S10a and S20a are then performed.

The step S10a is a first failure determination process to determine an open fault in the MOSFETs 11 and 12 in the first main path 1m and switches the path based on the result of the determination.

In step S11a, it is determined whether the SW both-end voltage difference is greater than a predetermined value. The control circuit section 21, 22 determines whether the difference in voltage between the two ends of the first main switch section is greater than a predetermined value based on the output value of the first both-end voltage determiner 26a. If the control circuit section 21, 22 determines that the difference in voltage is greater than a predetermined value, it is assumed that either the first MOSFET 11 or the second MOSFET 12 has an open fault, and proceeds to step S14a. If the control circuit section 21, 22 determines that the difference in voltage is not greater than the predetermined value, it is assumed that the first MOSFET 11 and the second MOSFET 12 do not have open faults, and proceeds to step S13a.

In Step S14a, it is determined whether the voltage of the first power supply 210 is larger than or equal to that of the second power supply 220. The control circuit section 21, 22 make a determination using the output result of the voltage difference determiner 27a, as in step S14. If the control circuit section 21, 22 determines that the voltage of the first power supply 210 is greater than or equal to the voltage of the second power supply 220, it proceeds to step S17a. If the control circuit section 21, 22 determines that the voltage of the first power supply 210 is not greater than or equal to the voltage of the second power supply 220, it proceeds to step S16a.

In step S13a, the first main route 1m is selected. The first control circuit section 21 selects the first main path 1m as the path to be turned on, rather than turning it on.

In step S16a, the first switching path 3 is selected. The second control circuit section 22 selects the first switching path 3 as the path to be turned on, rather than turning it on.

In step S17a, the first sub-route 1s is selected. The second control circuit section 22 and the third control circuit section 23 select the first sub-path 1s. At this time, the second control circuit section 22 selects the fourth MOSFET 14 in the first sub-path 1s. The third control circuit section 23 selects the third MOSFET 13 in the first sub-path 1s in response to instructions from the second control circuit section 22. The second control circuit section 22 selects the fourth MOSFET 14 as the switch to be turned on, rather than turning it on. The third control circuit section 23 selects the third MOSFET 13 as the switch to be turned on, rather than turning it on.

Step S20a is a second fault determination process to determine an open fault in the MOSFETs 17 and 18 in the second main path 2m and to switch the path based on the result of the determination.

In step S21a, it is determined whether the SW both-end voltage difference is greater than a predetermined value. The control circuit section 23, 24 determines whether the difference in voltage at both ends of the second main switch section is greater than a predetermined value based on the output value of the second both-end voltage determiner 26b. If the control circuit section 23, 24 determines that the difference in voltages is greater than a predetermined value, it is assumed that either the seventh MOSFET 17 or the eighth MOSFET 18 has an open fault, and proceeds to step S24*a*. If the control circuit section 23, 24 determines that the difference in voltages is not greater than the predetermined value, it is assumed that the seventh MOSFET 17 and the eighth MOSFET 18 do not have open faults, and proceeds to step S23*a*.

In step S24*a*, it is determined whether the voltage of the first power supply 210 is larger than or equal to that of the second power supply 220. The control circuit section 23, 24 make a determination using the output result of the voltage difference determiner 27*a*, as in step S24. If the control circuit section 23, 24 determines that the voltage of the first power supply 210 is greater than or equal to the voltage of the second power supply 220, it proceeds to step S27*a*. If the control circuit section 23, 24 determines that the voltage of the first power supply 210 is not greater than or equal to the voltage of the second power supply 220, it proceeds to step S26*a*.

In step S23*a*, the second main route 2*m* is selected. The fourth control circuit section 24 selects the second main path 2*m* as the path to be turned on, rather than turning it on.

In step S26*a*, the second sub-route 2*s* is selected. The second control circuit section 22 and the third control circuit section 23 select the second sub-path 2*s*. At this time, the third control circuit section 23 selects the sixth MOSFET 16 in the second sub-path 2*s*. The second control circuit section 22 selects the fifth MOSFET 15 in the second sub-path 2*s* in response to instructions from the third control circuit section 23. The third control circuit section 23 selects the sixth MOSFET 16 as the switch to be turned on, rather than turning it on. The second control circuit section 22 selects the fifth MOSFET 15 as the switch to be turned on, rather than turning it on.

In step S27*a*, the second switching path 4 is selected. The third control circuit section 23 selects the second switching path 4 as the path to be turned on, rather than turning it on.

In step S6*a*, the non-selection switch is turned off. Each control circuit section 21-24 turns off switches that are not selected as switches to be turned on (non-selection switches), to restrict current from flowing back to the power supply 210, 220.

In step S6*b*, the selection switch is turned on. Each control circuit section 21-24 turns on the selected switch as described above.

As shown in FIG. 8, if the second MOSFET 12 is an open fault, the first sub-path 1*s* is turned on when YES decision is made in step S14*a*. If the second MOSFET 12 is an open fault, the first switching path 3 is turned on when NO decision is made in step S14*a*.

If the eighth MOSFET 18 is an open fault, the second switching path 4 is turned on when YES decision is made in step S24*a*. If the eighth MOSFET 18 is an open fault, the first sub-path 1*s* is turned on when NO decision is made in step S24*a*.

Thus, the control circuit 20 forms the power supply path so that power is supplied to the first circuit 310 even if an open fault occurs in the first main path 1*m*. Similarly, the control circuit 20 forms the power supply path so that power is supplied to the second circuit 320 even if an open fault occurs in the second main path 2*m*. Therefore, the control circuit 20 can maintain the operation of the circuits 310 and 320 even in the event of an open fault in the main path 1*m*, 2*m*.

First Modification

Figure 11:
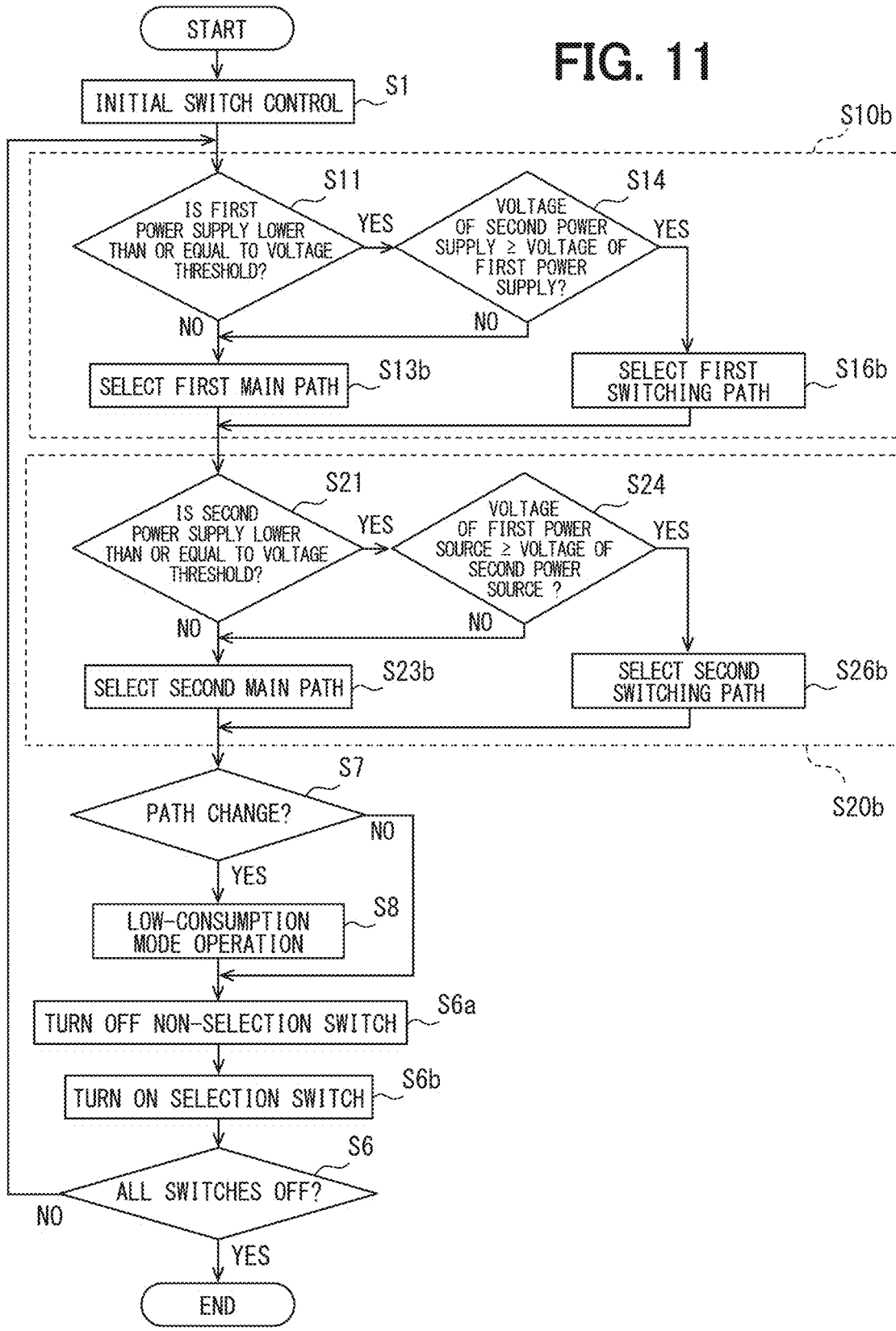
FIG. 11 is a flowchart showing operation in a power switching circuit of a first modification.
Figure 12:
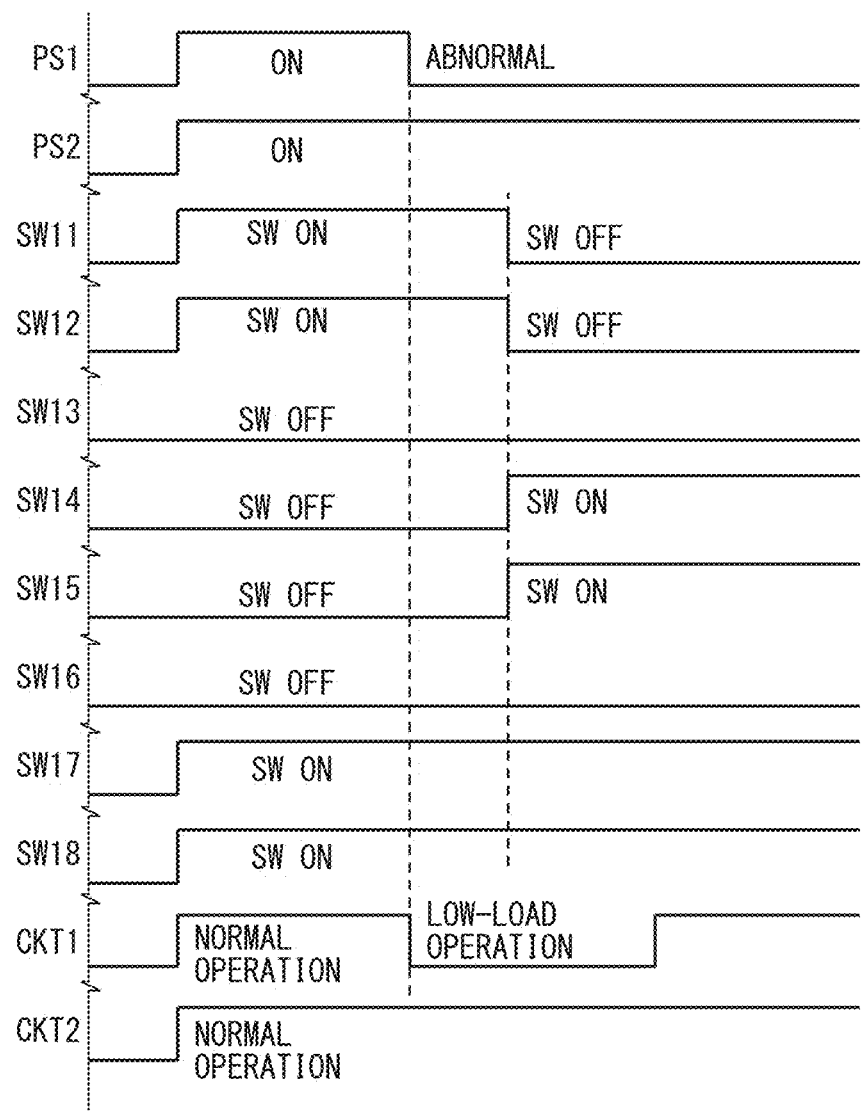
FIG. 12 is a timing chart showing operation in the power switching circuit of the first modification.

A first modification will be described with reference to FIGS. 11 and 12. The first modification differs from the above embodiment in the operation of the control circuit 20. In FIG. 11, "b" is assigned to the number of step that is similar to FIG. 5.

The control circuit 20 performs step S1 as in the above embodiment. Steps S10*b* and S20*b* are then performed.

Step S10*b* is a variant of the first switching process. Step S10*b* includes step S13*b* instead of steps S12 and S13. Step S10*b* includes step S16*b* instead of steps S15 and S16.

The first control circuit section 21 executes step S13*b* if NO decision is made in step S11. Step S13*b* is the same as step S13*a*.

The second control circuit section 22 executes step S16*b* if YES decision is made in step S14. Step S16*b* is the same as step S16*a*.

Step S20*b* is a variant of the second switching process. Step S20*b* includes step S23*b* instead of steps S22 and S23. Step S10*b* includes step S26*b* instead of steps S25 and S26.

The fourth control circuit section 24 executes step S23*b* if NO decision is made in step S21. Step S23*b* is similar to step S13*a*.

The third control circuit section 23 executes step S26*b* if YES decision is made in step S24. Step S26*b* is similar to step S27*a*.

The control circuit 20 executes step S7 after step S20*b* is completed. In step S7, whether or not there is a path change is determined. In the first switching process S10*b* and the second switching process S20*b*, the control circuit 20 goes to step S8 if the path is changed, or goes to step S6*a* if the path is not changed. In other words, if there is no change in the power supply path, the control circuit 20 does not enter the low-consumption mode and continues to operate as is.

In step S8, a low-consumption mode operation is performed. The control circuit 20 instructs the first circuit 310 and the second circuit 320 to operate in low consumption mode. In other words, the control circuit 20 temporarily places the first circuit 310 and the second circuit 320 in a low load state. Operation in the low-consumption mode can also be referred to as low-load operation. The low consumption mode includes, for example, an operation stoppage and an intermittent operation.

When the control circuit 20 selects the first switching path 3, only the first circuit 310 may be in a low load state. Similarly, the control circuit 20 may place only the second circuit 320 in a low load state when the second switching path 4 is selected.

Steps S6*a* and S6*b* are the same as above. In other words, after turning off the non-selection switch, the control circuit 20 turns on the selection switch with the first circuit 310 and the second circuit 320 operating in low consumption mode. As shown in FIG. 12, the power switching circuit 101, for example, turns off the first main path 1*m* and turns on the first switching path 3 with the first circuit 310 operating in low consumption mode when the first power supply 210 is abnormal.

Thus, when switching the power supply path from the first main path 1*m* to the first switching path 3, the control circuit 20 turns on the first switching path 3 with the first circuit 310 operating in low consumption mode. When switching the power supply path from the second main path 2*m* to the second switching path 4, the control circuit 20 turns on the second switching path 4 with the second circuit 320 operating in low consumption mode. Therefore, the power switching circuit 101 can suppress voltage fluctuations when switching paths. The first modification may perform steps S2-S5 above.

Second Modification

Figure 13:
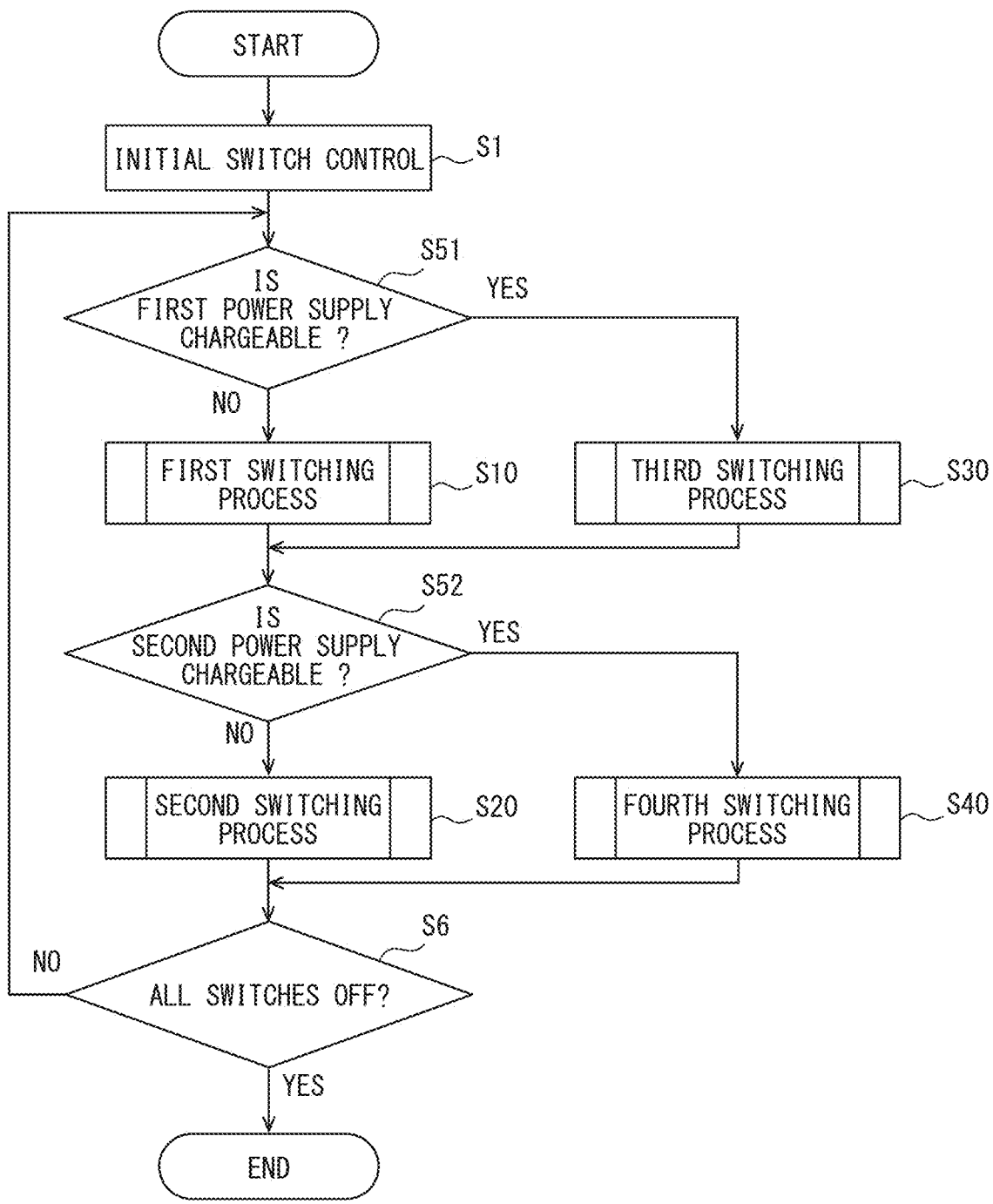
FIG. 13 is a flowchart showing operation in a power switching circuit of a second modification.
Figure 14:
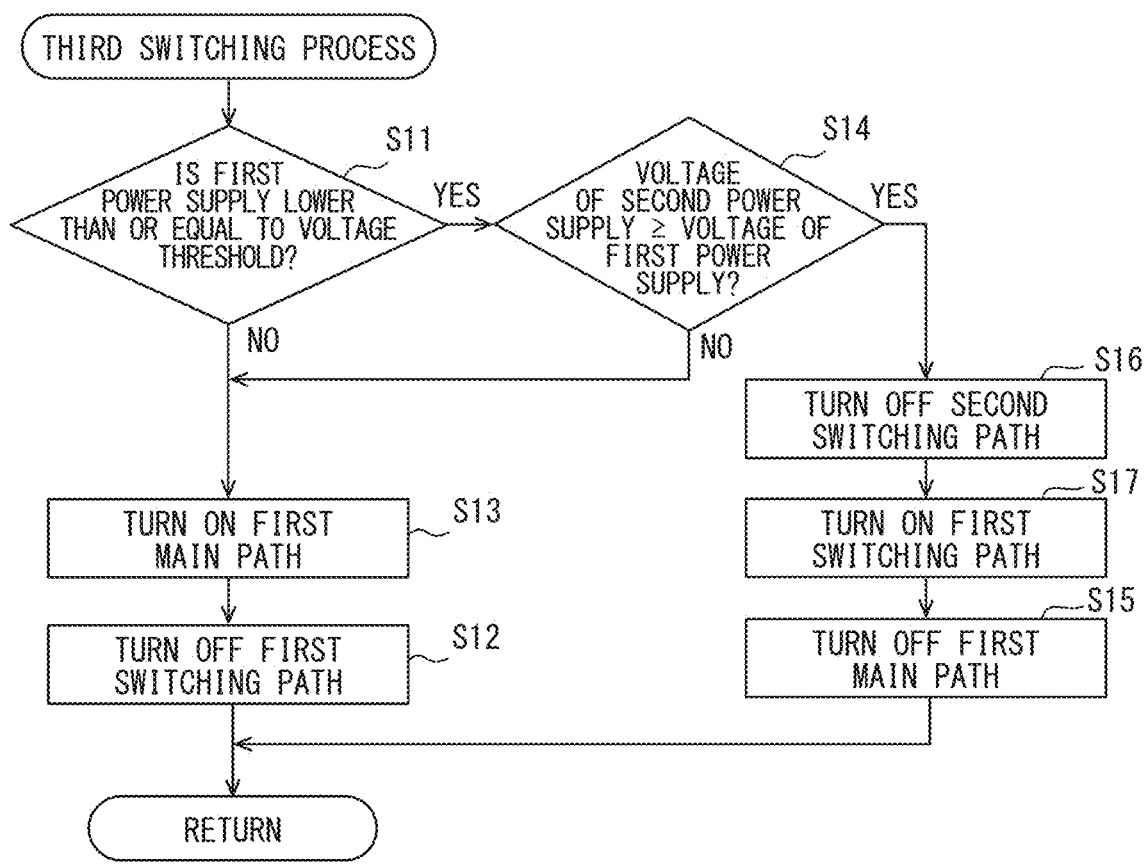
FIG. 14 is a flowchart showing operation of the power switching circuit when the first power supply is chargeable.
Figure 15:
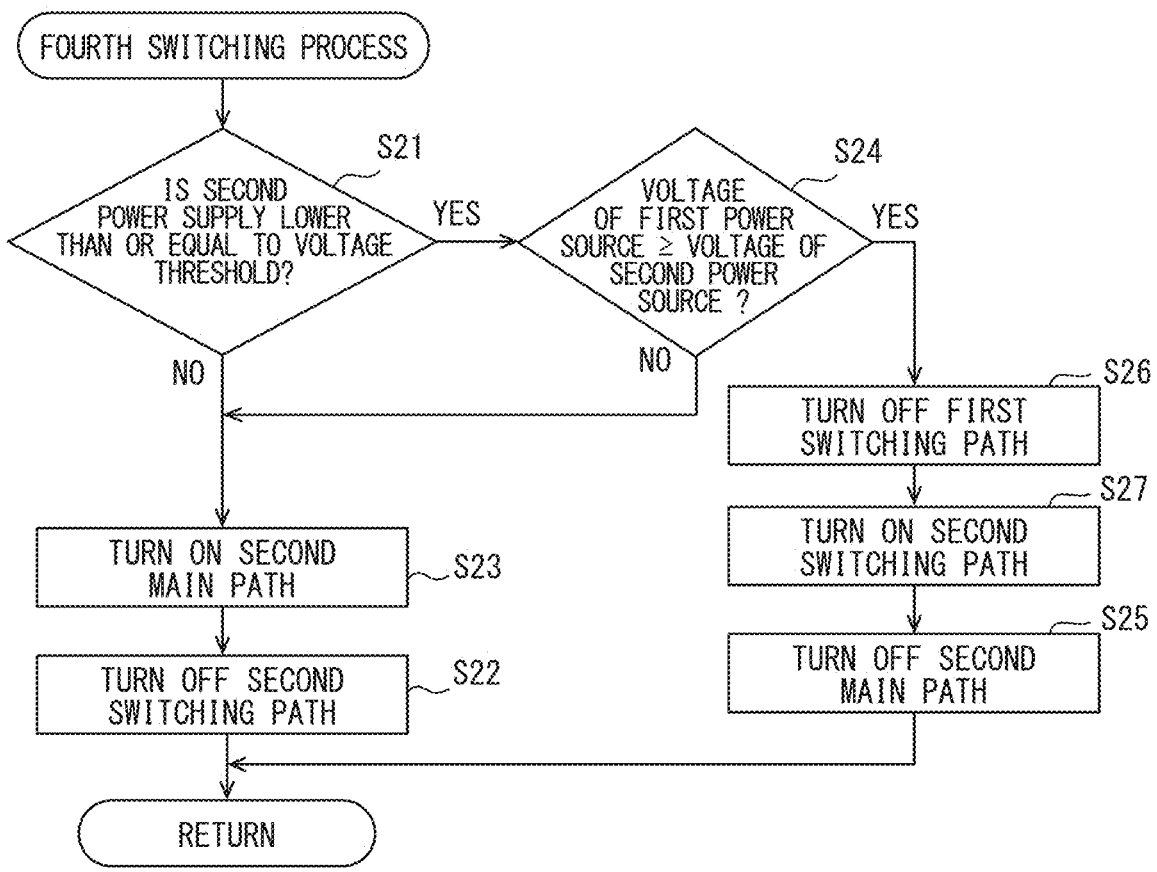
FIG. 15 is a flowchart showing operation of the power switching circuit when the second power supply is chargeable.

A second modification is described with reference to FIGS. 13, 14, and 15. The second modification differs from the above embodiment in the operation of the control circuit 20. The control circuit 20 changes the switching process depending on whether the power supplies 210 and 220 are available for charging. In FIGS. 13 through 15, the same step numbers are assigned to the same steps as in FIG. 5.

The control circuit 20 performs step S1 as in the above embodiment. Step S51 is then performed.

In step S51, it is determined whether or not the first power supply 210 is chargeable. The first control circuit section 21 and the second control circuit section 22 determine whether the first power supply 210 is a rechargeable secondary battery or a primary battery that cannot be recharged. For example, the first control circuit section 21 and the second control circuit section 22 are configured to obtain power supply information indicating whether the first power supply 210 is chargeable or not. The first control circuit section 21 and the second control circuit section 22 determine whether the first power supply 210 is chargeable based on the power supply information. If the first control circuit section 21 and the second control circuit section 22 determine that charging is possible, go to step S30. If the first control circuit section 21 and the second control circuit section 22 determine that charging is not possible, go to step S10.

Step S30 performs steps S11 and S14 as in step S10, as shown in FIG. 14. If NO decision is made in step S11, step S13 is executed, and step S12 is executed. If YES decision is made in step S14, step S16, step S17 and step S15 are executed in this order. The control circuit 20 turns off the other switching path before one switching path is turned on.

In step S52, it is determined whether the second power supply 220 is chargeable or not. The third control circuit section 23 and the fourth control circuit section 24 determine whether the second power supply 220 is a rechargeable secondary battery or a primary battery that cannot be recharged, similar to the first power supply 210. If the third control circuit section 23 and the fourth control circuit section 24 determine that charging is possible, proceed to step S40. If the third control circuit section 23 and the fourth control circuit section 24 determine that charging is not possible, proceed to step S20.

Step S40 is similar to step S20, as shown in FIG. 15, and steps S21 and S24 are performed. If NO decision is made in step S21, step S22 is executed, and step S23 is executed. If YES decision is made in step S24, step S26, step S27 and step S25 are executed in this order. The control circuit 20 turns off the other switching path before one switching path is turned on. The control circuit 20 may process steps S51, S10, and S30 in parallel with steps S52, S20, and S40. Steps S51 and S52 may be performed by any one of the control circuit sections 21 to 24. In this case, the control circuit section transmits the determination results of steps S51 and S52 to the other control circuit section. Alternatively, the control circuit section may store the determination results of steps S51 and S52 in a memory device so that the other control circuit section can refer to the determination results.

When switching from the first main path 1m to the first switching path 3, the control circuit 20 forms the power supply path so that the first power supply 210 and the second power supply 220 are temporarily connected to the first circuit 310 if the first power supply 210 is chargeable. Similarly, when switching from the second main path 2m to the second switching path 4, the control circuit 20 forms the power supply path so that the first power supply 210 and the second power supply 330 are temporarily connected to the second circuit 320 if the second power supply 220 is chargeable. Therefore, the power switching circuit 101 can suppress voltage fluctuations during switching when the power supplies 210 and 220 are chargeable.

When switching from the first main path 1m to the first switching path 3, the control circuit 20 forms the power supply path so that the first power supply 210 and the second power supply 220 are not connected to the first circuit 310 if the first power supply 210 is not available for charging. Similarly, when switching from the second main path 2m to the second switching path 4, the control circuit 20 forms the power supply path so that the first power supply 210 and the second power supply 220 are not connected to the second circuit 320 if the second power supply 220 is not available for charging. Thus, the power switching circuit 101 can restrict the current from flowing backwards and degrading or damaging the power supplies 210, 220 if the power supplies 210, 220 are not chargeable.

The power switching circuit 101 of the second modification can achieve the same effects as the above embodiment. The power switching circuit 101 in the second modification can be used whether the power supplies 210 and 220 are rechargeable or not. In other words, the power switching circuit 101 in the second modification can perform power switching in a general-purpose manner. The power switching circuit 101 in the second modification may perform steps S2-S5. In this case, the power switching circuit 101 of the second modification can switch power supplies in a generic manner and maintain operation of the first circuit 310 and the second circuit 320 that have not suffered a short circuit fault. The power switching circuit 101 may be configured to perform only one of the first and third switching processes, and one of the second and fourth switching processes, depending on whether the power supplies 210, 220 are chargeable.

As described above, the embodiment and the modifications of the present disclosure are described. However, the present disclosure is not limited in any way to the embodiment, and modifications can be performed without departing from the spirit of the present disclosure. Hereinafter, the second to fourth embodiments will be described as other modes of the present disclosure. The embodiments can be implemented independently, or can be implemented in combination as appropriate. The present disclosure is not limited to the combinations shown in the embodiments, but can be implemented by various combinations.

Second Embodiment

Figure 16:
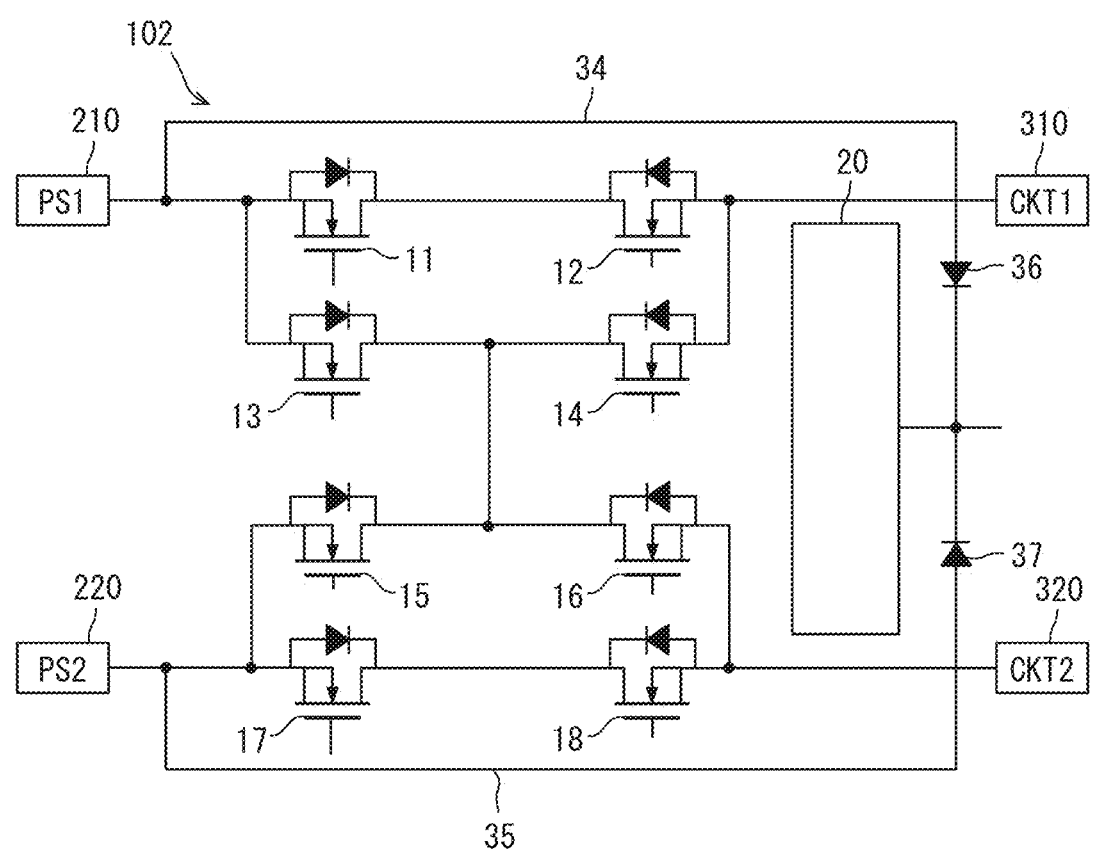
FIG. 16 is a circuit diagram illustrating a schematic configuration of a power switching circuit according to a second embodiment.

FIG. 16 is used to describe the power switching circuit 102 of the second embodiment. The power switching circuit 102 differs from the power switching circuit 101 in the power supply path to the control circuit 20. The operation of the control circuit 20 is the same as in the above embodiment (including the modifications). In FIG. 16, the gate wiring 40 is omitted in illustration.

As shown in FIG. 16, the power switching circuit 102 has a first operating power path 34 and a second operating power path 35. The first operating power path 34 includes a first diode 36. The second operating power path 35 includes a second diode 37. The control circuit 20 is connected to the first power supply 210 via the first operating power path 34 and to the second power supply 220 via the second operating power path 35. Thus, the control circuit 20 is configured to be powered by both the first power supply 210 and the second power supply 220. The power switching circuit 102 can also be said that the power supplies 210 and 220 are OR (parallel) connected to the control circuit 20.

The power switching circuit 102 can achieve the same effect as the power switching circuit 101. The power switching circuit 102 can also perform the switching process by the control circuit 20 when a power failure occurs in one of the power supplies 210 and 220.

Third Embodiment

Figure 17:
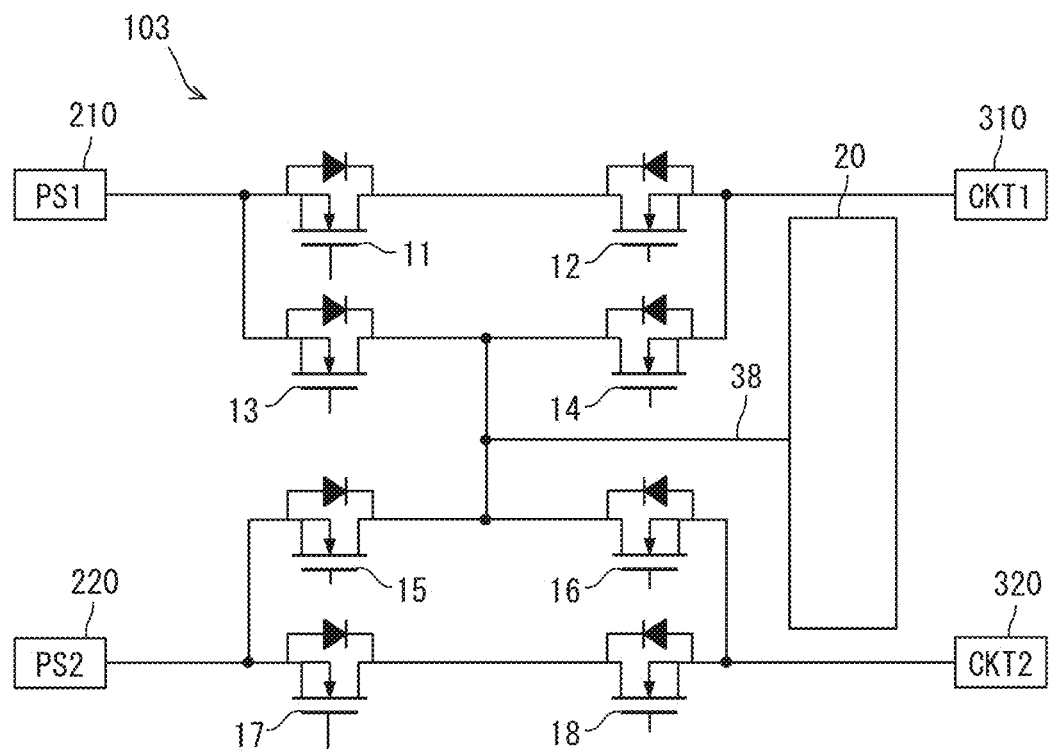
FIG. 17 is a circuit diagram illustrating a schematic configuration of a power switching circuit according to a third embodiment.

FIG. 17 is used to describe the power switching circuit 103 of the third embodiment. The power switching circuit 103 differs from the power switching circuit 101 in the power supply path to the control circuit 20. The operation of the control circuit 20 is the same as in the above embodiment (including the modification). In FIG. 17, the gate wiring 40 is omitted in illustration.

As shown in FIG. 17, the power switching circuit 103 has an operating power path 38. The operating power path 38 connects the switching wiring 33 to the control circuit 20. Thus, the control circuit 20 is configured to be powered by both the first power supply 210 and the second power supply 220, as in the second embodiment. The power switching circuit 103 can also be said that the power supplies 210 and 220 are OR (parallel) connected to the control circuit 20.

The power switching circuit 103 can achieve the same effect as the power switching circuit 101. The power switching circuit 103 can also perform the switching process by the control circuit 20 when a power failure occurs in one of the power supplies 210 and 220.

Fourth Embodiment

Figure 18:
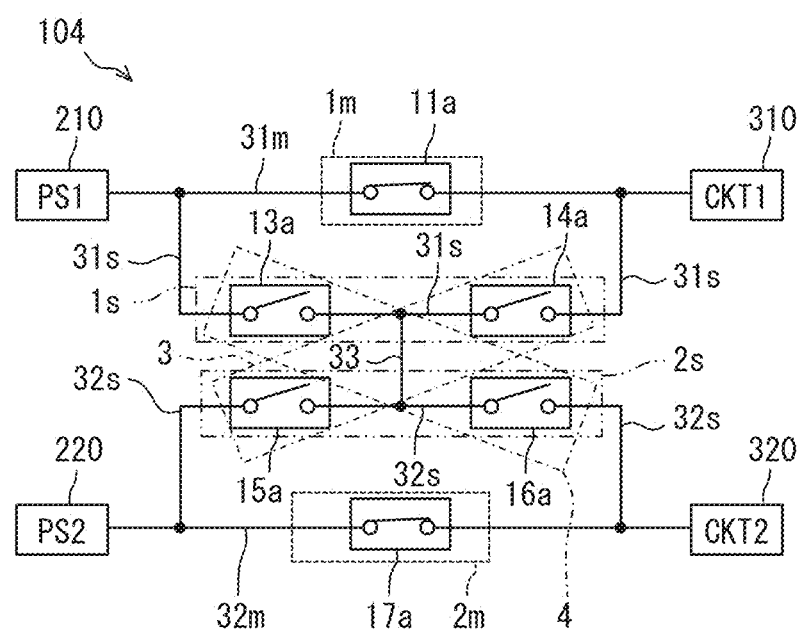
FIG. 18 is a circuit diagram illustrating a schematic configuration of a power switching circuit according to a fourth embodiment.

A power switching circuit 104 according to a fourth embodiment will be described with reference to FIG. 18 to FIG. 20. The power switching circuit 104 differs from the power switching circuit 101 in having mechanical switches 11a, 13a to 17a instead of the MOSFETs 11 to 18. In FIG. 18, a wiring for turning on and off the mechanical switches 11a, 13a to 17a is omitted in illustration.

The power switching circuit 104 has a first mechanical switch 11a, a third mechanical switch 13a, a fourth mechanical switch 14a, a fifth mechanical switch 15a, a sixth mechanical switch 16a, and a seventh mechanical switch 17a.

The first main path 1m includes the first mechanical switch 11a and the first main wiring 31m. The first mechanical switch 11a is an alternative to the first semiconductor switching device. The first sub-path 1s includes the third mechanical switch 13a, the fourth mechanical switch 14a and the first sub-wiring 31s.

The second main path 2m includes the seventh mechanical switch 17a and the second main wiring 32m. The seventh mechanical switch 17a is an alternative to the second semiconductor switching device. The second sub-path 2s includes the fifth mechanical switch 15a, the sixth mechanical switch 16a and the second sub-wiring 32s.

The first switching path 3 includes the fifth mechanical switch 15a, the fourth mechanical switch 14a, a part of the second sub-wiring 32s, a part of the first sub-wiring 31s, and the switching wiring 33. The fourth mechanical switch 14a and the fifth mechanical switch 15a are alternative to the third semiconductor switching device.

The second switching path 4 includes the third mechanical switch 13a, the sixth mechanical switch 16am, a part of the first sub-wiring 31s, a part of the second sub-wiring 32s, and the switching wiring 33. The third mechanical switch 13a and the sixth mechanical switch 16a are alternative to the fourth semiconductor switching device.

Figures 19, 20:
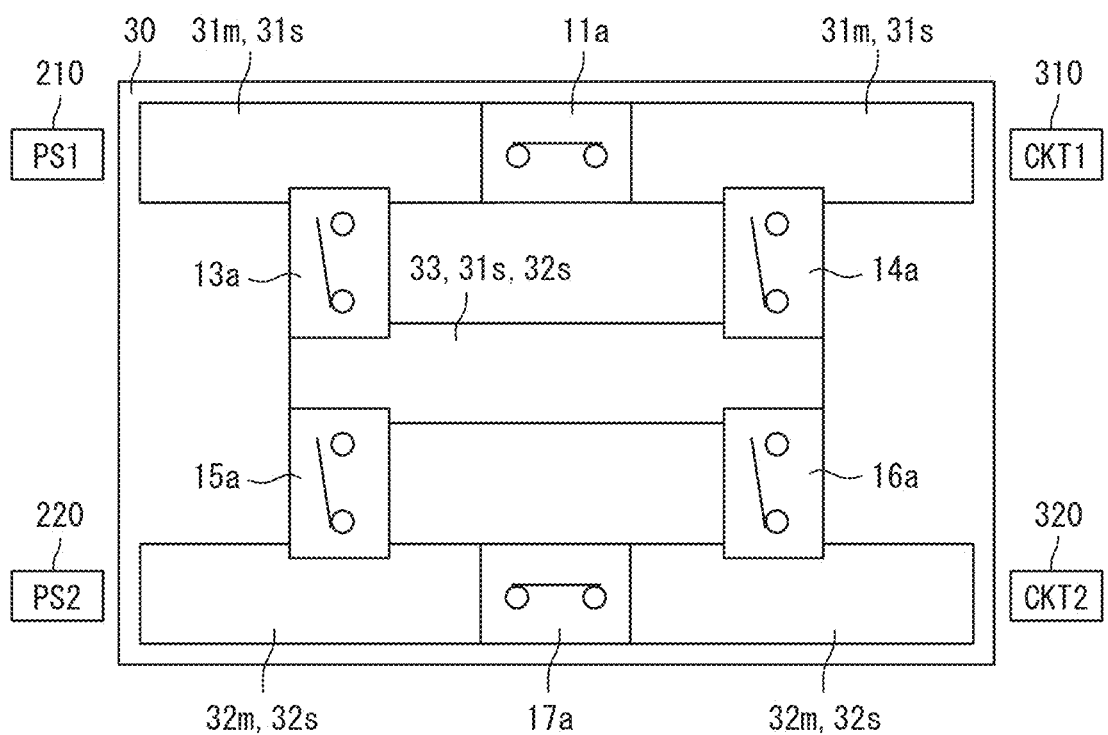
FIG. 19 is a view showing on/off of each mechanical switch under normal condition.
FIG. 20 is a plan view of the power switching circuit in the fourth embodiment.

As shown in FIG. 19, the control circuit 20 controls the mechanical switch 11a, the third mechanical switch 13a, the fourth mechanical switch 14a, the fifth mechanical switch 15a, the sixth mechanical switch 16a, and the seventh mechanical switch 17a on and off. As in the above embodiment, the control circuit 20 also determines short-circuit and open faults, and performs processing operations when a fault is determined. As shown in FIG. 20, the power switching circuit 104 can be configured on the circuit board 30 without the use of vias or other components.

The power switching circuit 104 can achieve the same effect as the power switching circuit 101. Furthermore, the mechanical switches 11a, 17a, etc. can shut off current in both directions when switched off. Therefore, the power switching circuit 104 can set the main path 1m, 2m to have a single switch.

Although the present disclosure has been described in accordance with the embodiments, it is understood that the present disclosure is not limited to such embodiments or structures. The present disclosure encompasses various modifications and variations within the scope of equivalents. In addition, while various combinations and modes are described in the present disclosure, other combinations and modes including only one element, more elements, or less elements therein are also within the scope and spirit of the present disclosure.

What is claimed is:

1. A power switching circuit connected to a first power supply, a second power supply, a first circuit and a second circuit, the power switching circuit comprising:
   a first main path to supply power from the first power supply to the first circuit;
   a second main path to supply power from the second power supply to the second circuit;
   a first switching path to switch a power supply source of the first circuit from the first power supply to the second power supply when the first power supply is faulty;
   a second switching path to switch a power supply source of the second circuit from the second power supply to the first power supply when the second power supply is faulty; and
   a control circuit to form a power supply path by controlling each of the first main path, the second main path, the first switching path, and the second switching path in either a conducting or non-conducting state, wherein
   the control circuit forms the power supply path, when a failure is generated in one of the first circuit and the second circuit, that does not affect operation of the other of the first circuit and the second circuit.

2. The power switching circuit according to claim 1, wherein the first main path, the second main path, the first switching path, and the second switching path are formed on a same plane of a circuit board.

3. The power switching circuit according to claim 1, wherein
   the first main path has two first semiconductor switching devices connected by body diode cathodes, one end connected to the first power supply and the other end connected to the first circuit,
   the second main path has two second semiconductor switching devices connected by body diode cathodes, one end connected to the second power supply and the other end connected to the second circuit,
   the first switching path has two third semiconductor switching elements connected to each other with body diode cathodes via a switching wiring, one end connected to the second power supply and the other end connected to the first circuit, and the second switching path has two fourth semiconductor switching elements connected to each other with body diode cathodes via the switching wiring, one end connected to the first power supply and the other end connected to the second circuit.

4. The power switching circuit according to claim 3, wherein the control circuit has a first control section that controls the first semiconductor switching device, a second control section that controls the second semiconductor switching device, a third control section that controls the third semiconductor switching device, and a fourth control section that controls the fourth semiconductor switching device.

5. The power switching circuit according to claim 4, wherein each of the first control section, the second control section, the third control section, and the fourth control section is individually supplied with operating power.

6. The power switching circuit according to claim 4, wherein the control circuit is to be powered from either the first power supply or the second power supply.

7. The power switching circuit according to claim 3, wherein the control circuit is an ideal diode controller.

8. The power switching circuit according to claim 1, wherein in case where the control circuit switches from the first main path to the first switching path, when the first power supply is chargeable, the control circuit forms the power supply path so that the first power supply and the second power supply are temporarily connected to the first circuit, and in case where the control circuit switches from the second main path to the second switching path, when the second power supply is chargeable, the control circuit forms so that the first power supply and the second power supply are temporarily connected to the second circuit.

9. The power switching circuit according to claim 1, wherein in case where the control circuit switches from the first main path to the first switching path, when the first power supply is not chargeable, the control circuit forms the power supply path so that the first power supply and the second power supply are not connected to the first circuit, and in case where the control circuit switches from the second main path to the second switching path, when the second power supply is not chargeable, the control circuit forms the power supply path so that the first power supply and the second power supply are not connected to the second circuit.

10. The power switching circuit according to claim 1, wherein a wiring connecting the first switching path and the first circuit is connected to a first capacitor, and a wiring connecting the second switching path and the second circuit is connected to a second capacitor.

11. The power switching circuit according to claim 1, wherein when the power supply path is switched from the first main path to the first switching path, the control circuit puts the first switching path in the conducting state after putting the first circuit in a low load state, and when the power supply path is switched from the second main path to the second switching path, the control circuit puts the second switching path in the conducting state after putting the second circuit in a low load state.

12. The power switching circuit according to claim 3, wherein the control circuit forms the power supply path so that power is supplied to the first circuit and the second circuit when a failure is generated in the first main path or the second main path.

13. The power switching circuit according to claim 1, wherein the control circuit puts one of the first switching path and the second switching path in the non-conducting state before the control circuit puts the other of the first switching path and the second switching path in the conducting state.

* * * * *